US012786985B2

(12) United States Patent
Hosseini et al.

(10) Patent No.: US 12,786,985 B2
(45) Date of Patent: Nov. 3, 2026

(54) SIDELINK SCHEDULING REQUEST

(71) Applicant: QUALCOMM Incorporated, San Diego, CA (US)

(72) Inventors: Seyedkianoush Hosseini, San Diego, CA (US); Hwan Joon Kwon, San Diego, CA (US); Wanshi Chen, San Diego, CA (US); Krishna Kiran Mukkavilli, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 363 days.

(21) Appl. No.: 17/446,805

(22) Filed: Sep. 2, 2021

(65) Prior Publication Data

US 2022/0070890 A1 Mar. 3, 2022

Related U.S. Application Data

(60) Provisional application No. 62/706,696, filed on Sep. 3, 2020.

(51) Int. Cl.

| | |
|---|---|
| ***H04W 72/12*** | (2023.01) |
| ***H04W 28/26*** | (2009.01) |
| ***H04W 72/04*** | (2023.01) |
| ***H04W 72/0446*** | (2023.01) |
| ***H04W 72/0453*** | (2023.01) |
| ***H04W 72/1263*** | (2023.01) |

(52) U.S. Cl.

CPC ....... *H04W 72/1263* (2013.01); *H04W 28/26* (2013.01); *H04W 72/0446* (2013.01); *H04W 72/0453* (2013.01)

(58) Field of Classification Search

CPC ......... H04W 72/0446; H04W 72/0453; H04W 72/0457; H04W 72/044; H04W 72/04; H04W 72/1263; H04W 72/121; H04W 72/12; H04W 72/02; H04W 72/20; H04W 28/26; H04W 28/16

See application file for complete search history.

(56) References Cited

U.S. PATENT DOCUMENTS

| | | | | |
|---|---|---|---|---|
| 2016/0338095 | A1* | 11/2016 | Faurie | H04W 72/23 |
| 2018/0324842 | A1 | 11/2018 | Gulati et al. | |
| 2019/0268920 | A1* | 8/2019 | Falahati | H04W 72/0446 |
| 2019/0274121 | A1* | 9/2019 | Wu | H04W 48/10 |

(Continued)

FOREIGN PATENT DOCUMENTS

| | | | | |
|---|---|---|---|---|
| CA | 3066679 | A1 * | 3/2019 | H04W 4/40 |
| CA | 3066929 | A1 * | 3/2019 | |

(Continued)

OTHER PUBLICATIONS

International Search Report and Written Opinion—PCT/US2021/071368—ISA/EPO—Dec. 13, 2021.

(Continued)

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a first user equipment (UE) may transmit, to a second UE, a request for a sidelink resource allocation. The UE may receive scheduling information identifying the sidelink resource allocation. Numerous other aspects are provided.

28 Claims, 15 Drawing Sheets

500

(56) References Cited

U.S. PATENT DOCUMENTS

| | | | | |
|---|---|---|---|---|
| 2020/0146048 | A1* | 5/2020 | Lee | H04W 72/535 |
| 2020/0322939 | A1* | 10/2020 | Cao | H04W 72/02 |
| 2020/0351033 | A1* | 11/2020 | Ryu | H04W 72/0453 |
| 2021/0029675 | A1* | 1/2021 | Ji | H04L 1/1896 |
| 2021/0050954 | A1* | 2/2021 | Ryu | H04W 72/02 |
| 2021/0051646 | A1* | 2/2021 | Maaref | H04W 72/30 |
| 2021/0410178 | A1* | 12/2021 | Wang | H04W 72/20 |
| 2022/0353047 | A1* | 11/2022 | Loehr | H04L 5/0092 |
| 2022/0353856 | A1* | 11/2022 | Luo | H04W 72/542 |
| 2023/0050943 | A1* | 2/2023 | Luo | H04W 72/20 |
| 2023/0077735 | A1* | 3/2023 | Ji | H04W 72/21<br>370/329 |

FOREIGN PATENT DOCUMENTS

| | | | | |
|---|---|---|---|---|
| CN | 107071916 A | | 8/2017 | |
| CN | 111557112 A | | 8/2020 | |
| CN | 111602444 A | | 8/2020 | |
| CN | 3721664 | * | 5/2023 | |
| EP | 3621380 A1 | | 3/2020 | |
| EP | 3721664 B1 | * | 5/2023 | H04W 72/0406 |
| WO | WO-2017193943 A1 | * | 11/2017 | H04W 28/20 |
| WO | WO-2019136626 A1 | | 7/2019 | |
| WO | WO 2020/035142 | * | 2/2020 | H04W 72/04 |
| WO | WO-2020028662 A1 | | 2/2020 | |

OTHER PUBLICATIONS

Nokia, et al., "Sidelink Resource Allocation with Relay UE", 3GPP Daft, 3GPP TSG RAN WG1 Meeting #89, R1-1708564, Sidelink Resource Allocation with Relay UE V2, 3rd Generation Partnership Project (3GPP), Mobile Competence Centre, 650, Route Des Lucioles, F-06921 Sophia-Antipolis Cedex, F, vol. RAN WG1, No. Hangzhou, China, May 15, 2018-May 19, 2017, May 14, 2017 (May 14, 2017), XP051273756, pp. 1-7, Retrieved from the Internet: URL: http://www.3gpp.org/ftp/Meetings_3GPP_SYNC/RAN1/Docs/. [Retrieved on May 14, 2017]. section 2, figure 2, p. 2-p. 3, p. 3, figure 2.

* cited by examiner

SIDELINK SCHEDULING REQUEST

CROSS-REFERENCE TO RELATED APPLICATION

This patent application claims priority to U.S. Provisional Patent Application No. 62/706,696, filed on Sep. 3, 2020, entitled "SIDELINK SCHEDULING REQUEST," and assigned to the assignee hereof. The disclosure of the prior application is considered part of and is incorporated by reference into this patent application.

INTRODUCTION

Aspects of the present disclosure generally relate to wireless communication and to techniques and apparatuses for sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first UE includes transmitting, to a second UE, a request for a sidelink resource allocation. In some aspects, the method includes receiving scheduling information identifying the sidelink resource allocation.

In some aspects, a method of wireless communication performed by a first UE includes receiving, from a second UE, a request for a sidelink resource allocation. In some aspects, the method includes transmitting scheduling information identifying the sidelink resource allocation.

In some aspects, a first UE for wireless communication includes a memory and one or more processors coupled to the memory. The memory and the one or more processors may be configured to transmit, to a second UE, a request for a sidelink resource allocation. The memory and the one or more processors may be configured to receive scheduling information identifying the sidelink resource allocation.

In some aspects, a first UE for wireless communication includes a memory and one or more processors coupled to the memory. The memory and the one or more processors may be configured to receive, from a second UE, a request for a sidelink resource allocation. The memory and the one or more processors may be configured to transmit scheduling information identifying the sidelink resource allocation.

In some aspects, a non-transitory computer-readable medium storing a set of instructions for wireless communication includes one or more instructions that, when executed by one or more processors of a first UE, cause the first UE to transmit, to a second UE, a request for a sidelink resource allocation, and receive scheduling information identifying the sidelink resource allocation.

In some aspects, a non-transitory computer-readable medium storing a set of instructions for wireless communication includes: one or more instructions that, when executed by one or more processors of a first UE, cause the first UE to receive, from a second UE, a request for a sidelink resource allocation, and transmit scheduling information identifying the sidelink resource allocation.

In some aspects, an apparatus for wireless communication includes means for transmitting, to a UE, a request for a sidelink resource allocation, and means for receiving scheduling information identifying the sidelink resource allocation.

In some aspects, an apparatus for wireless communication includes means for receiving, from a UE, a request for a sidelink resource allocation, and means for transmitting scheduling information identifying the sidelink resource allocation.

In some aspects, a method of wireless communication performed by a base station includes configuring, for a first UE, a set of sidelink resources dedicated for requests for sidelink resource allocations. The method may include receiving, from the first UE via a second UE, a request for a sidelink resource allocation associated with the set of sidelink resources. The method may include transmitting, to the first UE via the second UE, scheduling information indicating the sidelink resource allocation.

In some aspects, a base station for wireless communication includes a memory; and one or more processors coupled to the memory. The memory and the one or more processors may be configured to configure, for a first UE, a set of sidelink resources dedicated for requests for sidelink resource allocations. The memory and the one or more processors may be configured to receive, from the first UE via a second UE, a request for a sidelink resource allocation associated with the set of sidelink resources. The memory and the one or more processors may be configured to transmit, to the first UE via the second UE, scheduling information indicating the sidelink resource allocation.

In some aspects, a non-transitory computer-readable medium storing a set of instructions for wireless communication includes one or more instructions that, when executed by one or more processors of a base station, cause the base station to configure, for a first UE, a set of sidelink resources dedicated for requests for sidelink resource allocations. The one or more instructions may cause the base station to receive, from the first UE via a second UE, a request for a sidelink resource allocation associated with the set of sidelink resources. The one or more instructions may cause the base station to transmit, to the first UE via the second UE, scheduling information indicating the sidelink resource allocation.

In some aspects, an apparatus for wireless communication includes means for configuring, for a first UE, a set of sidelink resources dedicated for requests for sidelink resource allocations. The apparatus may include means for receiving, from the first UE via a second UE, a request for a sidelink resource allocation associated with the set of sidelink resources. The apparatus may include means for transmitting, to the first UE via the second UE, scheduling information indicating the sidelink resource allocation.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
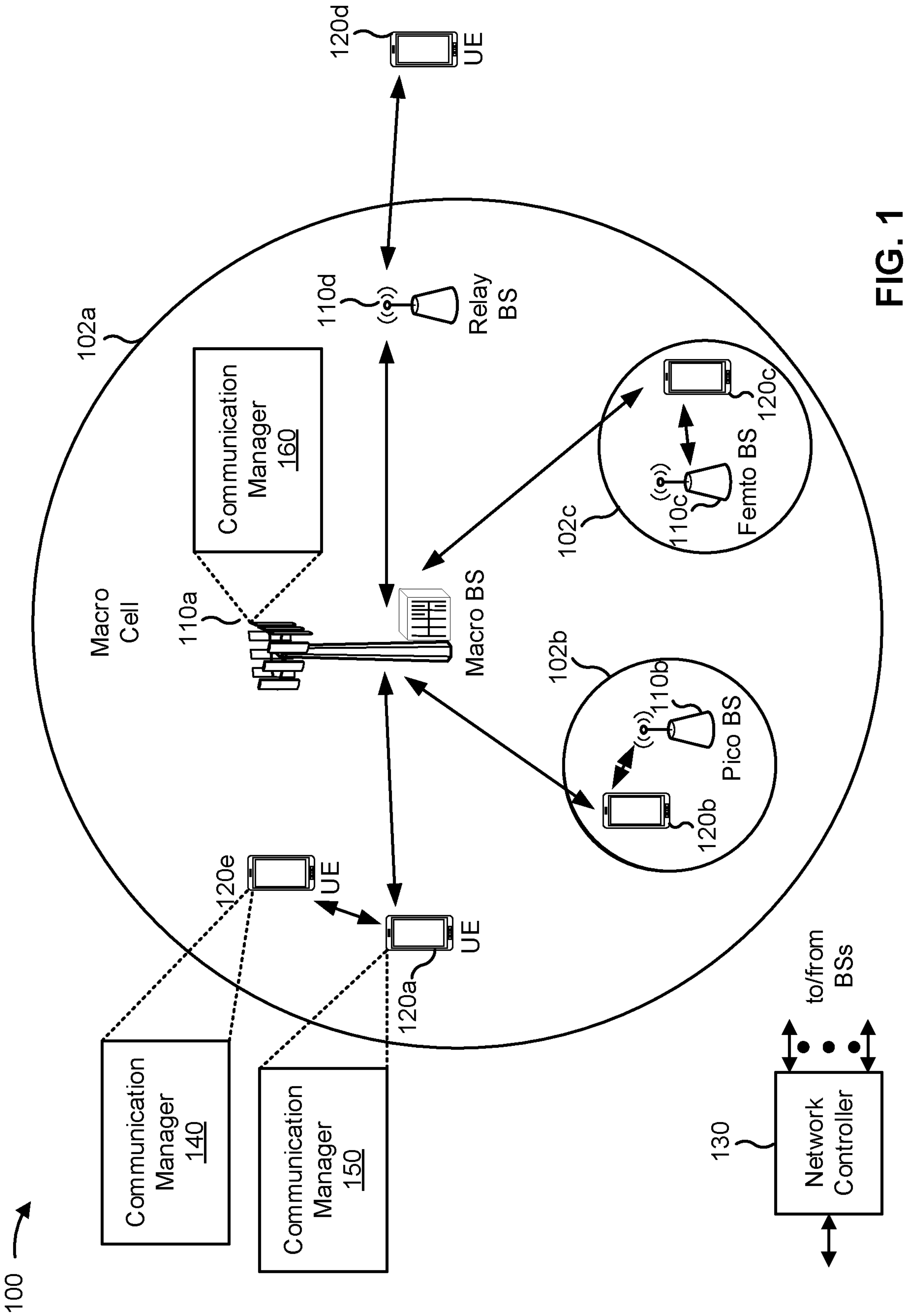
FIG. 1 is a diagram illustrating an example of a wireless network, in accordance with the present disclosure.

Sidelink communication provides for communication between UEs. A sidelink deployment can be centrally scheduled or can be scheduled by the UEs included in the sidelink deployment. A first UE (e.g., a sidelink transmit UE) may transmit data to a second UE (e.g., a sidelink receive UE) on a sidelink resource identified by a sidelink resource allocation. The second UE may monitor a plurality of sidelink resources (e.g., sub-channels) to receive the data from the first UE. For example, the second UE may transmit a request for the sidelink resource allocation, and the first UE may provide the sidelink resource allocation based at least in part on the request. In some aspects, the second UE may monitor a limited range of resources. For example, the second UE may be a low-capability UE (e.g., a reduced capability (RedCap) UE, an Internet of Things UE, a machine-type communication UE, a low-power UE, a UE associated with a diminished radio frequency capability, or a similar UE), a wearable device, and/or the like. For such UEs, it may be resource-intensive and inefficient to monitor a large range of sidelink resources for scheduling information, or to transmit a request within a large range of resources, due to costs associated with tuning, processing, and/or the like. Similarly, the first UE may expend significant resources monitoring a large range of sidelink resources for a request.

Some techniques and apparatuses described herein enable the transmission, by a first UE, of a request for a sidelink resource allocation, and the transmission, by a second UE, of scheduling information indicating the sidelink resource allocation. In some aspects, the first UE may transmit the request on a first set of resources, and the second UE may transmit the scheduling information on a second set of resources corresponding to the first set of resources. By transmitting the request and the scheduling information on respective configured sets of resources, processing and communication resources of the first UE and the second UE may be conserved. Furthermore, a size of the request and/or the scheduling information may be reduced based at least in part on the first set of resources being configured for the first UE, meaning that the request and/or the scheduling information may not need to identify the first UE. Some techniques and apparatuses described herein also provide sequence-based requests, requests transmitted on a sidelink channel, and buffer status report based requests.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120*e* may include a communication manager 140. As described in more detail elsewhere herein, the communication manager 140 may provide means for transmitting, to a second UE, a request for a sidelink resource allocation and means for receiving scheduling information identifying the sidelink resource allocation. Additionally, or alternatively, the communication manager 140 may perform one or more other operations described herein.

As shown in FIG. 1, the UE 120*a* may include a communication manager 150. As described in more detail elsewhere herein, the communication manager 150 may provide means for receiving, from a second UE, a request for a sidelink resource allocation; and means for transmitting scheduling information identifying the sidelink resource allocation. Additionally, or alternatively, the communication manager 150 may perform one or more other operations described herein.

As shown in FIG. 1, the BS 110 (e.g., BS 110*a*) may include a communication manager 160. As described in more detail elsewhere herein, the communication manager 160 may provide means for configuring, for a first UE, a set of sidelink resources dedicated for requests for sidelink resource allocations; means for receiving, from the first UE via a second UE, a request for a sidelink resource allocation associated with the set of sidelink resources; and means for transmitting, to the first UE via the second UE, scheduling information indicating the sidelink resource allocation. Additionally, or alternatively, the communication manager 160 may perform one or more other operations described herein.

As indicated above, FIG. 1 is provided merely as an example. Other examples may differ from what is described with regard to FIG. 1.

Figure 2:
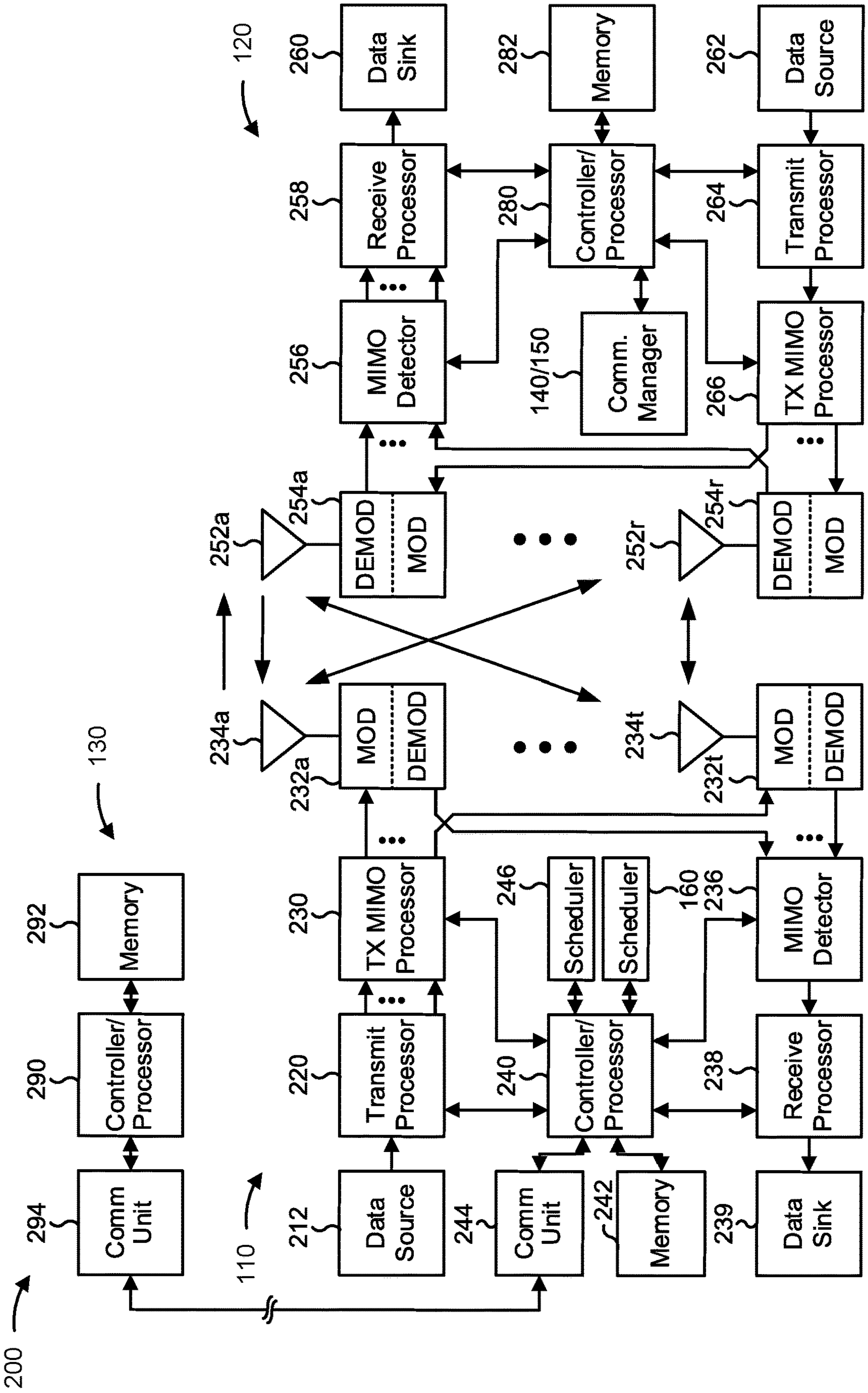
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with sidelink communication, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 may provide means for transmitting, to a second UE, a request for a sidelink resource allocation; means for receiving scheduling information identifying the sidelink resource allocation; means for receiving, from a second UE, a request for a sidelink resource allocation; and means for transmitting scheduling information identifying the sidelink resource allocation, and/or the like. Additionally, or alternatively, the UE 120 may provide means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
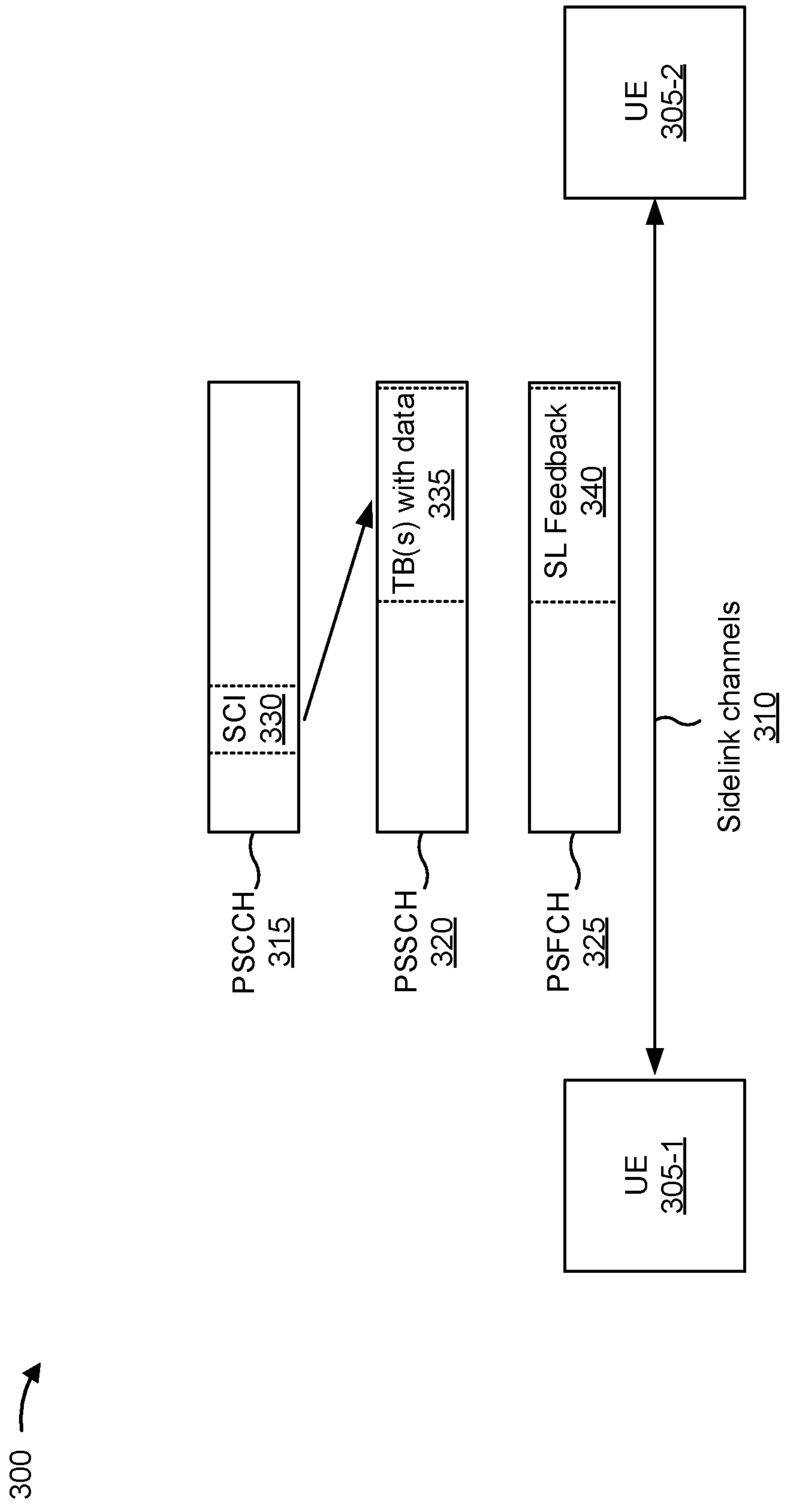
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
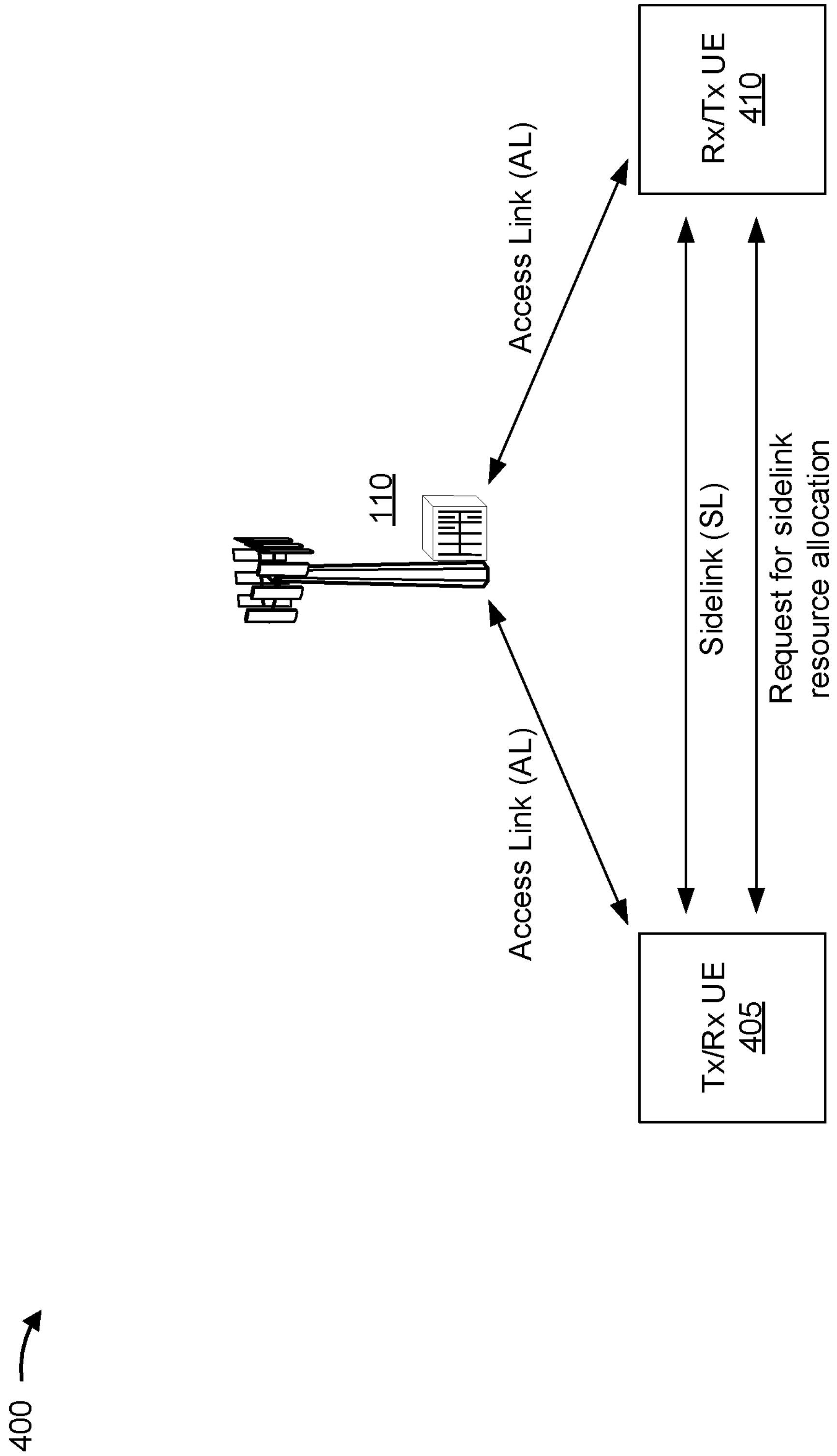
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications, which may include requests for sidelink resource allocations and scheduling information indicating sidelink resource allocations, may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Sidelink resources may be allocated for sidelink transmissions between UEs. Sidelink resource allocation may be grouped into two separate modes. In a first mode (Mode 1), sidelink resources for sidelink transmissions may be dynamically scheduled by a base station. Alternatively, in the first mode, sidelink resources for sidelink transmissions may be semi-statically configured by the base station. In a second mode (Mode 2), sidelink resources for sidelink transmissions may be selected using sensing and reservation. For example, a UE may sense available sidelink resources and reserve an available sidelink resource for an upcoming sidelink transmission.

A first UE (e.g., a sidelink Tx UE) may transmit data to a second UE (e.g., a sidelink Rx UE) on a sidelink resource identified by a sidelink resource allocation. In the first mode and the second mode of resource allocation, the second UE may monitor a plurality of sidelink resources (e.g., subchannels) to receive the data over a PSCCH or PSSCH from the first UE. In some aspects, the first UE may monitor a limited range of resources. For example, the first UE be a low-capability UE, a wearable device, and/or the like (though the techniques described herein are not limited to such UEs). For such UEs, it may be resource-intensive and inefficient to monitor a large range of sidelink resources for scheduling information, or to transmit a request within a large range of resources, due to costs associated with tuning, processing, and/or the like. Similarly, the second UE may expend significant resources monitoring a large range of sidelink resources for a request.

Figure 5:
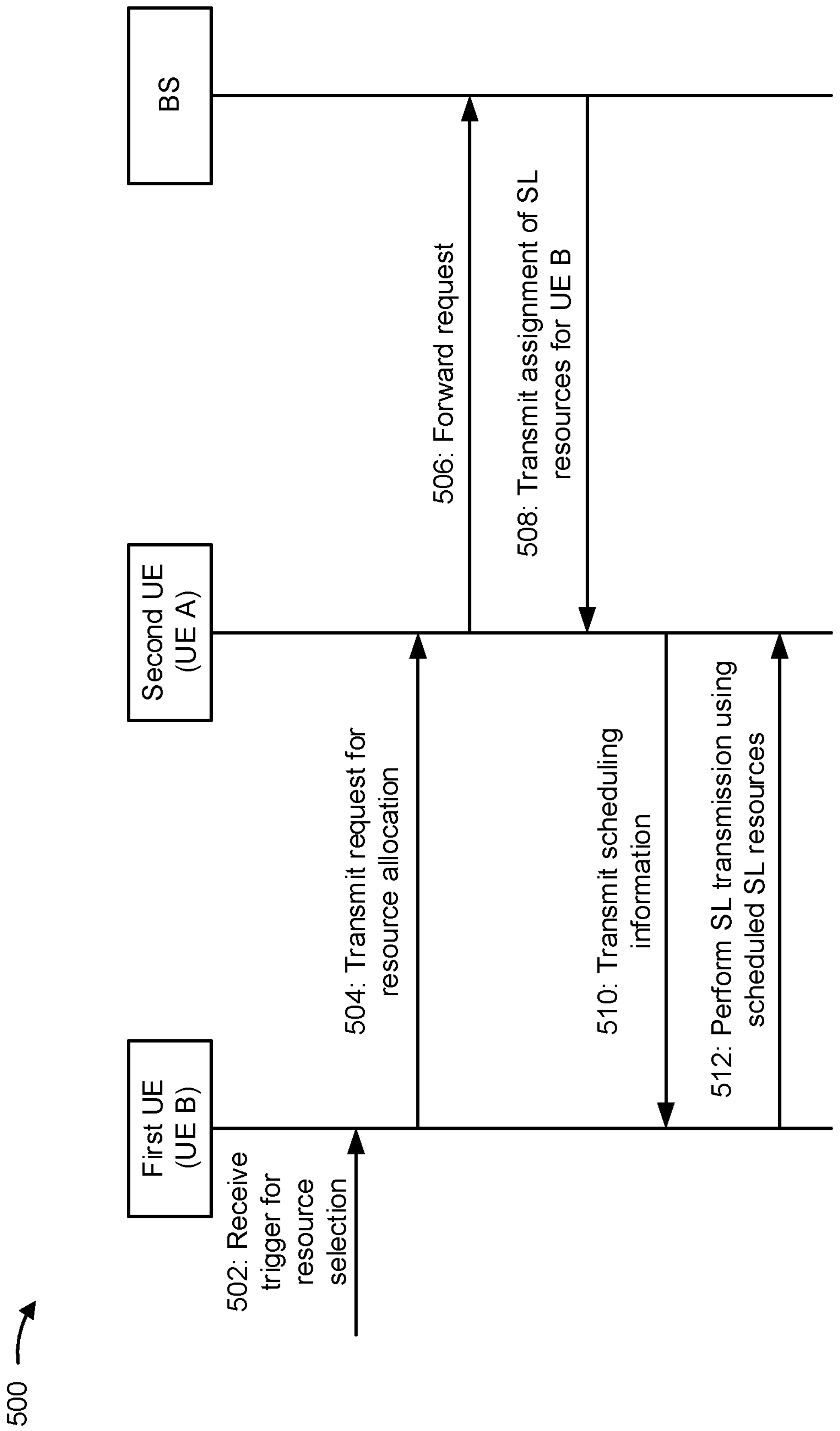
FIG. 5 is a diagram illustrating an example of requesting a sidelink resource allocation and receiving scheduling information based at least in part on the request, in accordance with the present disclosure.
Figure 6B:
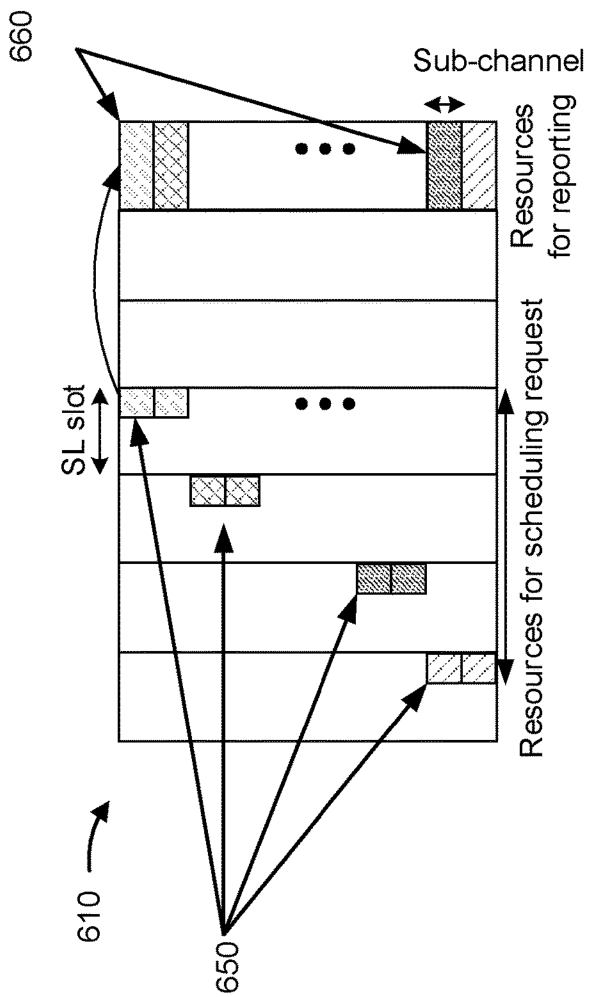
FIGS. 6A and 6B are diagrams illustrating examples of resource sets reserved for a request for a sidelink resource allocation and corresponding scheduling information based at least in part on the request, in accordance with the present disclosure.
Figure 6A:
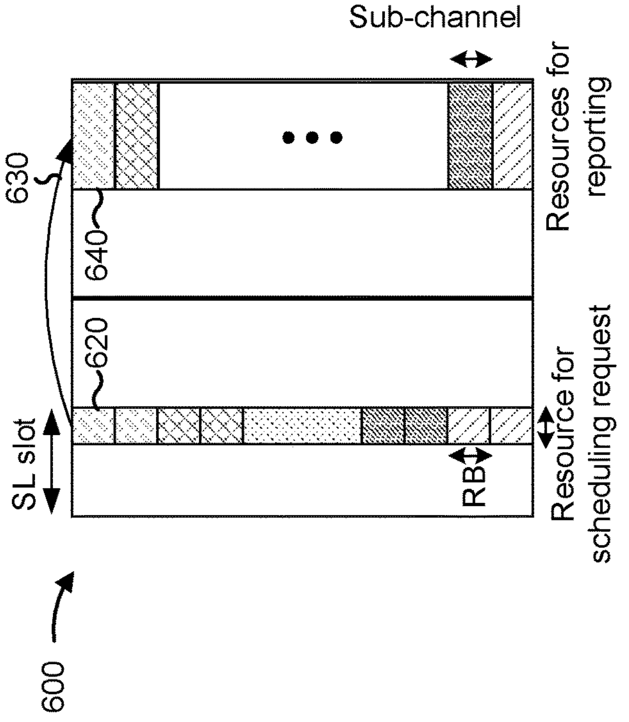

FIG. 5 is a diagram illustrating an example 500 of requesting a sidelink resource allocation and receiving scheduling information based at least in part on the request, in accordance with the present disclosure. FIGS. 6A and 6B are diagrams illustrating examples 600 and 610 of resource sets reserved for a request for a sidelink resource allocation and corresponding scheduling information based at least in part on the request, in accordance with the present disclosure.

As shown in FIG. 5, example 500 includes communication between a first UE (e.g., UE 120*a*), a second UE (e.g., UE 120*e*), and a base station (e.g., base station 110*a*). In some aspects, the first UE, the second UE, and the base station 110*a* may be included in a wireless network such as wireless network 100. The first UE and the second UE may communicate on a wireless sidelink. In some aspects, the base station may be associated with a radio access link to one or more of the first UE or the second UE. In some aspects, the base station may be associated with a radio access link to only the second UE. If the base station is associated with a radio access link to only the second UE, the second UE may function as a relay between the base station and the first UE, for example, for the purpose of relaying data communications, scheduling information, and/or the like.

As shown by reference number 502, the first UE (UE B) may receive a trigger for sidelink resource selection. For example, the first UE may receive or generate data to be transmitted using a sidelink resource. In some aspects, the first UE may be a wearable device, such as a head-mounted display, a smart watch, and/or the like.

As shown by reference number 504, the first UE may transmit a request for resource allocation to the second UE (UE A). In other words, the first UE may request an allocation of sidelink resources from the second UE, or may request information indicating resources associated with an allocation of sidelink resources. The resources associated with the allocation of sidelink resources may include preferred resources (e.g., resources from which the first UE can select a resource for transmission, or resources forming the allocation of sidelink resources), non-preferred resources (e.g., resources that the first UE should avoid for resource selection), or a combination thereof. In some aspects, the request may be referred as a scheduling request or a sidelink scheduling request (SL-SR). In some aspects, the second UE may be a relay device, such as a mobile device that acts as a relay for the first UE. In some aspects, the request may be transmitted via SCI-1 or SCI-2 of a sidelink shared channel (SL-SCH) or a medium access control control element (MAC-CE).

The UE may transmit the request in accordance with a first configuration (e.g., using a first configuration). The first configuration may indicate sidelink resources for transmission of the request, a sequence for generating the request, a sidelink channel on which to transmit the request (e.g., a sidelink control channel or a sidelink shared channel), a timer indicating a minimum time spacing between transmissions of requests associated with a same scheduling request configuration, a configuration value indicating a maximum number of requests associated with the same scheduling request configuration, a sidelink shared channel for the request (e.g., based at least in part on the first UE being scheduled with a sidelink resource for transmission to the second UE), or the like, as described in more detail below.

In some aspects, the request may be transmitted on a set of resources that is dedicated (e.g., reserved) for requests for sidelink resource allocations. For example, the request may be transmitted on a set of dedicated slots and/or subchannels. The set of resources that is dedicated for requests for sidelink resource allocations may be referred to as a first set of resources. The first set of resources may be associated with (e.g., mapped to) a second set of resources on which scheduling information (e.g., scheduling information shown by reference number 510, described below) corresponding to a request transmitted on the first set of resources may be transmitted. By mapping requests to the first set of resources and corresponding scheduling information to the second set of resources, the amount of resources to be monitored by the first UE and the second UE may be reduced, thereby reducing battery consumption and communication resource usage of the first UE and the second UE. In some aspects, a set of resources used for the scheduling information shown by reference number 510 may be reserved by the second UE in a periodic manner or in an aperiodic manner.

In some aspects, multiple requests (e.g., scheduling request (SR)) configurations can be configured or indicated to a first UE. In some cases, a first UE may be supported by multiple relay UEs or second UEs. In such a case, each SR configuration may be associated with one or more second UEs. Additionally, or alternatively, the beam used for the transmission of SR resources associated with a particular SR configuration may be configured. Thus, it is ensured that the SR is sent in the direction of the relay UE which is supposed to perform resource scheduling.

FIGS. 6A and 6B show a first example 600 and a second example 610. In the first example 600, resources 620 for a request (e.g., the request shown by reference number 504) are overlapped in time (e.g., in a same sidelink slot, a same part of a sidelink slot, and/or the like) and are distributed in frequency (e.g., are frequency division multiplexed). The time resource of the resources 620 may be referred to as a scheduling request occasion. As shown by reference number 630, the resources 620 may be mapped to resources 640 for reporting (e.g., a second set of resources on which scheduling information such as the scheduling information shown by reference number 510 is to be transmitted). This mapping may be indicated by a first configuration associated with the request and/or a second configuration associated with the scheduling information. For example, if the second UE receives a request on a resource 620 shown in FIG. 6A with a given fill, then the second UE may transmit scheduling information on a resource 640 with the same fill. In examples 600 and 610, two requesting resources (e.g., two first sets of resources) are configured per resource for reporting (e.g., one second set of resources) at a two-to-one ratio. In some aspects, these resources may be configured at a one-to-one ratio, a one-to-many ratio, a many-to-one ratio, or a many-to-many ratio. In some aspects, a resource 620 may occupy a resource block (RB) in the frequency domain and at least part of a slot (e.g., one or more symbols) in the time domain. In some aspects, a resource 640 may occupy a subchannel in the frequency domain and at least part of a slot (e.g., one or more symbols) in a time domain. In some aspects, the resource 640 may occupy an entire slot.

In the example 610, resources 650 for the scheduling request are distributed in time for different UEs. For example, a plurality of UEs may be configured with respective resources for scheduling requests. Each UE, of the plurality of UEs, may be associated with a different time and frequency (time/frequency) resource allocation for requests. Distributing the resources for the scheduling request in both time and frequency may improve diversity of the scheduling request, whereas multiplexing the resources in frequency and/or time may be more resource-efficient and may reduce configuration and scheduling complexity. In example 610, as in example 600, a resource 660 for reporting may correspond to a resource 650.

A UE that may transmit a request for sidelink scheduling may be configured with a first set of requesting resources 620/650 and a second set of resources 640/660 for reporting. In some aspects, the resources may be pre-configured, such as with a default value. In some aspects, the resources may be configured by a base station, such as via radio resource control (RRC) signaling. For example, the resources may be configured directly or indirectly (e.g., via the second UE). In many use cases, such as relaying for wearable devices, the wearable device itself is in coverage and can receive the configuration from a base station directly, and can inform the remote UEs. In some cases, the remote UE may also be in coverage, and can thus receive a downlink transmission indicating the configuration from the base station.

In some aspects, the resources may be configured on a per-resource-pool basis. For example, a resource pool may be associated with a configuration of resources used to request and report a sidelink resource allocation within the resource pool. In some aspects, a UE may be configured with a periodicity, a number of sidelink resources, a time duration, a frequency allocation (e.g., a number of frequency resources), and/or the like, for a resource 620/650 and/or a resource 640/660.

In some aspects, multiple configurations for resources 620/650 and corresponding resources 640/660 may be configured. For example, a different periodicity, number of resources, time duration and/or number of RBs/subchannels can be chosen for different configurations. Each configuration of a group of configurations may be available for requesting scheduling associated with a given set of priority levels. For example, each configuration may be available for requesting scheduling for a given set of priorities. In some aspects, only a set of resources are available for sending a request to a UE per each scheduling request occasion.

In some aspects, multiple carriers may be configured on the sidelink. In some aspects, a single carrier, of a plurality of carriers associated with the first UE, may be configured to include resources 620/650 and 640/660. Configuring a single carrier (e.g., a particular sidelink carrier, an only carrier of the plurality of carriers) to include such resources may be suitable for sidelink carrier aggregation. If a single carrier is configured, in some aspects, a request, such as the request shown by reference number 504, may indicate a set of sidelink carriers on which a sidelink resource allocation is requested. For example, the request may explicitly identify the set of sidelink carriers. In some aspects, a request may indicate a number of sidelink carriers on which the sidelink resource allocation is request (e.g., without explicitly identifying the sidelink carriers). In some aspects, the first UE can indicate for which carriers the first UE requires resources (e.g., based on a buffer status of the first UE).

Additionally, or alternatively, if a buffer status report can be included as part of the request, the second UE may schedule resources on multiple carriers, and may report the scheduled resources to the first UE as a sidelink resource allocation. In such examples, a sidelink carrier indicator (e.g., an indicator of a carrier associated with the sidelink scheduling request) may be included in the scheduling information. Indicating the set of sidelink carriers may improve flexibility of scheduling and requesting resources, whereas indicating the number of sidelink carriers may reduce overhead.

In some aspects, each carrier that can be used for data transmission may be configured (e.g., pre-configured) with resources 620/650 and 640/660. In some aspects, the second UE may schedule the resources on multiple carriers independently of a base station. In some aspects, the second UE may schedule the resources on multiple carriers based at least in part on signaling from the base station. For example, the base station may select a set of resources and may inform the second UE of the selected set of resources, and the selected UE may schedule the resources from the selected set of resources.

In some aspects, the request may be associated with a timer indicating a minimum time spacing between transmissions of requests associated with a same configuration (e.g., a same scheduling request configuration, a same set of logical channels) on the sidelink. Additionally, or alternatively, the request may be associated with a configuration value indicating a maximum number of requests associated with the same configuration. For example, the timer and the configuration value may be independent of a timer and a configuration value associated with a radio access link (e.g., a Uu link) of the first UE. In some aspects, the timer and the configuration value are configured by the second UE or a base station. In some aspects, the timer and the configuration value are negotiated by the first UE and the second UE. In some aspects, the timer may be indicated by a radio resource control (RRC) parameter, such as sl-sr-ProhibitTimer. In some aspects, the maximum number of requests may be indicated by an RRC parameter such as sl-sr-TransMax, and may be tracked via a counter value such as SL-SR_ COUNTER. After transmitting a request for a given scheduling request configuration, the first UE may not transmit another request until the timer has elapsed.

In some aspects, the request may be generated and/or transmitted based at least in part on a sequence. For example, the request may be generated based at least in part on a root sequence, a cyclic shift, a frequency of the request, and/or the like. The root sequence may include a low-correlation sequence, such as a constant amplitude zero autocorrelation (CAZAC) sequence. In some aspects, the sequence may be transmitted on a sidelink channel, such as a physical sidelink control channel (PSSCH), a physical sidelink shared channel (PSSCH), and/or the like. In some aspects, the first UE may determine whether to use the sequence or the sidelink channel based at least in part on a size of the request (e.g., in bits) and a sequence design of the sequence. In some aspects, the sequence may be a pseudo-random sequence, such as a Gold sequence or a Zadoff-Chu sequence. Different initializations of the sequence may be mapped to different sidelink resource configurations, and the mapping may be indicated via RRC signaling. In some aspects, the choice between the sequence or the sidelink channel may be dependent on how many bits a request needs to convey, and the sequence design. In some aspects, if the first UE has physical sidelink shared channel (PSSCH) resources for a transmission to the second UE, the UE may transmit the request as a buffer status report on the PSSCH resources (e.g., in a medium access control control element (MAC-CE) associated with the PSSCH), which conserves resources associated with providing a dedicated resource for a request.

Returning to FIG. 5, as shown by reference number 506, the second UE may receive the request for the sidelink resource allocation from the first UE. In some aspects, such as in Mode 1, the second UE may forward the request for resource allocation to a base station. As shown by reference number 508, the base station may receive the request for resource allocation from the second UE if the second UE forwards the request to the base station.

The base station or the second UE (e.g., using Mode 2 resource allocation involving sensing and resource reservation procedures) may assign sidelink resources for the first UE to perform sidelink transmissions. The sidelink resources may include preferred resources, non-preferred resources, or a combination thereof. For example, the base station or the second UE may assign the sidelink resources for the first UE based at least in part on the request and/or based at least in part on the information included in the request. As another example, the second UE may determine the sidelink resource allocation based at least in part on the request. If the base station assigns the sidelink resources, the base station may transmit, to the second UE, an assignment of sidelink resources for the first UE.

As shown by reference number 510, if the second UE forwards the request to the base station, the second UE may receive, from the base station, the assignment of sidelink resources for the first UE. The second UE may forward or transmit the assignment of sidelink resources to the first UE. In other words, the second UE may transmit scheduling information, to the first UE, that indicates the assignment of sidelink resources for the first UE. In some aspects, the second UE may transmit the scheduling information using a second configuration. The second configuration may indicate a resource on which the scheduling information should be transmitted (such as based at least in part on a resource on which a corresponding request is transmitted). In some aspects, the second configuration may be included within the first configuration, or the first configuration and the second configuration may be the same configuration information.

Based at least in part on the scheduling information, the first UE may determine particular sidelink resources that have been scheduled or reserved for sidelink transmissions from the first UE. In some aspects, the first UE may select the particular sidelink resources from a set of preferred resources indicated by the scheduling information. In some aspects, the first UE may select the particular sidelink resources to exclude non-preferred resources indicated by the scheduling information.

As shown by reference number 512, the first UE may perform a sidelink transmission with the second UE using a scheduled sidelink resource. In other words, the first UE may perform the sidelink transmission with the second UE based at least in part on the scheduling information received from the second UE. In some aspects, the first UE may select the scheduled sidelink resource from the sidelink resource allocation. In some aspects, the sidelink resource allocation may be the scheduled sidelink resource. For example, the UE may transmit the transmission on the sidelink resource allocation (e.g., an entirety of the sidelink resource allocation).

In one or more examples, the second UE may not act as a relay device, as data may be triggered and terminated at a PC5 interface. The second UE may be a source of data and/or a destination for data, such as when the first UE and/or the second UE are included in an IoT network.

As indicated above, FIGS. 5-6B are provided as examples. Other examples may differ from what is described with respect to FIGS. 5-6B.

Figure 7:
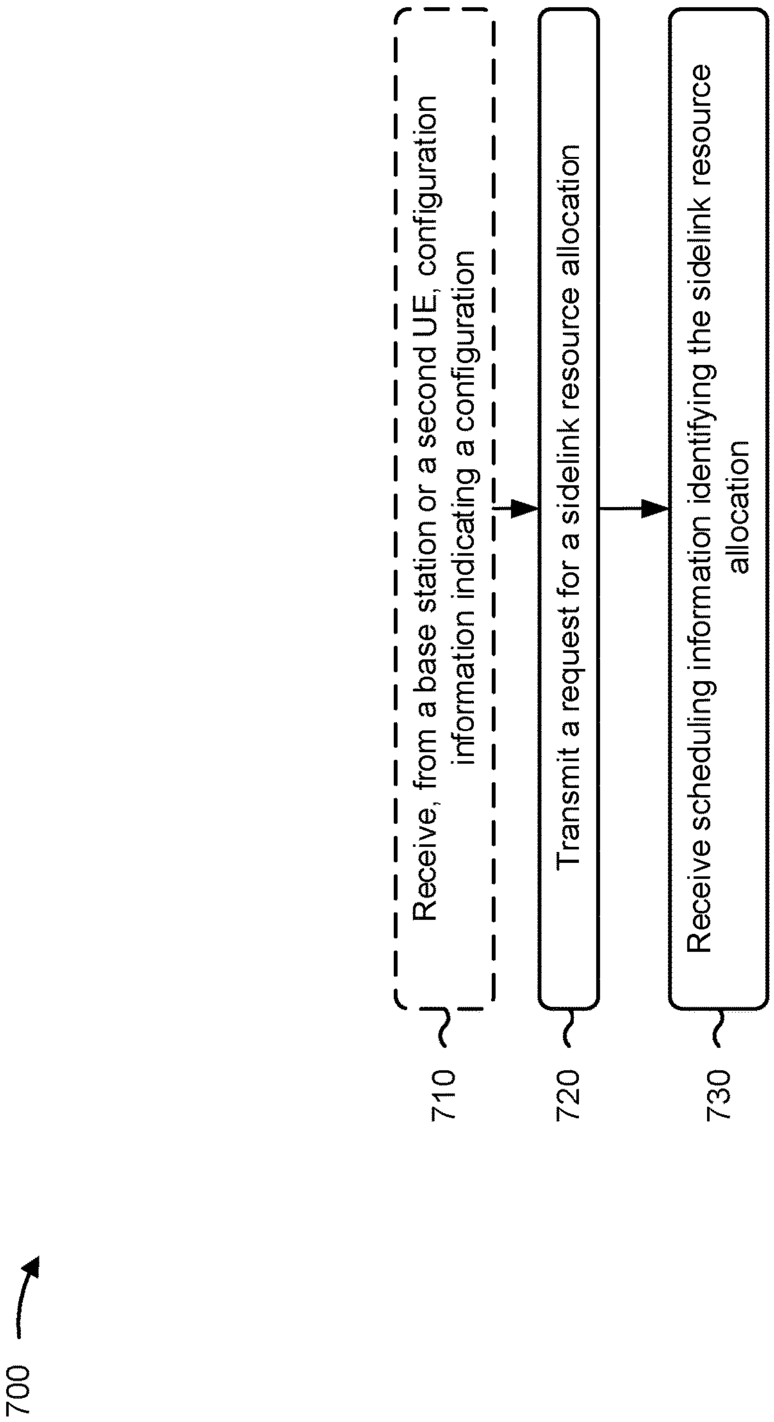
FIGS. 7 and 8 are diagrams illustrating example processes performed, for example, by a UE, in accordance with the present disclosure.

FIG. 7 is a diagram illustrating an example process 700 performed, for example, by a UE, in accordance with the present disclosure. Example process 700 is an example where a first UE (e.g., UE 120, UE 305, UE 405, the first UE of FIG. 5) performs operations associated with a sidelink scheduling request. Dashed blocks indicate optional steps.

As shown in FIG. 7, in some aspects, process 700 may include receiving, from a base station or a second UE, configuration information indicating a configuration (block 710). For example, the first UE (e.g., using antenna 252, transmit processor 264, TX MIMO processor 266, modulator 254, controller/processor 280, and/or memory 282) may receive, from a base station or a second UE, configuration information indicating a configuration, as described above. The configuration may be for a first set of resources on which to transmit a request for a sidelink resource allocation and/or a second set of resources on which to receive scheduling information associated with the request.

As shown in FIG. 7, in some aspects, process 700 may include transmitting, to a second UE, a request for a sidelink resource allocation (block 720). For example, the first UE (e.g., using antenna 252, transmit processor 264, TX MIMO processor 266, modulator 254, controller/processor 280, and/or memory 282) may transmit, to a second UE, a request for a sidelink resource allocation, as described above.

As further shown in FIG. 7, in some aspects, process 700 may include receiving scheduling information identifying the sidelink resource allocation (block 730). For example, the first UE (e.g., using antenna 252, demodulator 254, MIMO detector 256, receive processor 258, controller/processor 280, and/or memory 282) may receive scheduling information identifying the sidelink resource allocation, as described above.

Process 700 may include additional aspects, such as any single aspect or any combination of aspects described below and/or in connection with one or more other processes described elsewhere herein.

In a first aspect, the request is transmitted on a first set of sidelink resources reserved for requests for sidelink resource allocations.

In a second aspect, alone or in combination with the first aspect, the first set of sidelink resources is associated with a periodicity.

In a third aspect, alone or in combination with one or more of the first and second aspects, the first set of sidelink resources is configured for the first UE.

In a fourth aspect, alone or in combination with one or more of the first through third aspects, a configuration of the first set of sidelink resources indicates at least one of a periodicity associated with the first set of sidelink resources, a number of sidelink resources included in the first set of sidelink resources, a time duration of the first set of sidelink resources, or a number of frequency resources of the first set of sidelink resources.

In a fifth aspect, alone or in combination with one or more of the first through fourth aspects, the configuration corresponds to a set of priority levels for a transmission on the sidelink resource allocation.

In a sixth aspect, alone or in combination with one or more of the first through fifth aspects, process 700 includes receiving, from a base station or the second UE, configuration information indicating the configuration.

In a seventh aspect, alone or in combination with one or more of the first through sixth aspects, the configuration corresponds to a resource pool associated with the sidelink resource allocation.

In an eighth aspect, alone or in combination with one or more of the first through seventh aspects, the first set of sidelink resources is configured on a particular sidelink carrier of a plurality of sidelink carriers associated with the first UE.

In a ninth aspect, alone or in combination with one or more of the first through eighth aspects, the request indicates a set of sidelink carriers for the sidelink resource allocation.

In a tenth aspect, alone or in combination with one or more of the first through ninth aspects, the request indicates a number of sidelink carriers for the sidelink resource allocation.

In an eleventh aspect, alone or in combination with one or more of the first through tenth aspects, the particular sidelink carrier is an only carrier of the plurality of sidelink carriers configured with a set of resources dedicated or reserved for requests for sidelink resource allocations.

In a twelfth aspect, alone or in combination with one or more of the first through eleventh aspects, each sidelink carrier of the plurality of sidelink carriers is associated with a respective set of sidelink resources dedicated or reserved for requests for sidelink resource allocations.

In a thirteenth aspect, alone or in combination with one or more of the first through twelfth aspects, the sidelink resource allocation is scheduled on the plurality of sidelink carriers based at least in part on a buffer status report being included in the request.

In a fourteenth aspect, alone or in combination with one or more of the first through thirteenth aspects, the scheduling information includes a sidelink carrier indicator.

In a fifteenth aspect, alone or in combination with one or more of the first through fourteenth aspects, the first set of sidelink resources is selected from a plurality of sets of sidelink resources dedicated or reserved for requests for sidelink resource allocations.

In a sixteenth aspect, alone or in combination with one or more of the first through fifteenth aspects, the plurality of sets of sidelink resources are included in a same set of time resources.

In a seventeenth aspect, alone or in combination with one or more of the first through sixteenth aspects, each set of sidelink resources, of the plurality of sets of sidelink resources, is included in a different set of time resources.

In an eighteenth aspect, alone or in combination with one or more of the first through seventeenth aspects, the request is generated using a sequence.

In a nineteenth aspect, alone or in combination with one or more of the first through eighteenth aspects, the request is transmitted via a sidelink control channel or a sidelink shared channel. For example, the request may be transmitted via SCI-1 or SCI-2 of a sidelink shared channel (SL-SCH) or a medium access control control element (MAC-CE).

In a twentieth aspect, alone or in combination with one or more of the first through nineteenth aspects, the request is associated with a timer indicating a minimum time spacing between transmissions of requests associated with a same scheduling request configuration, and a configuration value indicating a maximum number of requests associated with the same scheduling request configuration.

In a twenty-first aspect, alone or in combination with one or more of the first through twentieth aspects, the timer and the configuration value are independent of a timer and a configuration value associated with a radio access link of the first UE.

In a twenty-second aspect, alone or in combination with one or more of the first through twenty-first aspects, the timer and the configuration value are configured by the second UE or a base station.

In a twenty-third aspect, alone or in combination with one or more of the first through twenty-second aspects, the timer and the configuration value are negotiated by the first UE.

In a twenty-fourth aspect, alone or in combination with one or more of the first through twenty-third aspects, the request is transmitted via a sidelink shared channel based at least in part on the first UE being scheduled with a sidelink resource for transmission to the second UE.

In a twenty-fifth aspect, alone or in combination with one or more of the first through twenty-fourth aspects, the scheduling information from the second UE is received on a second set of sidelink resources associated with a set of sidelink resources on which the request is transmitted.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
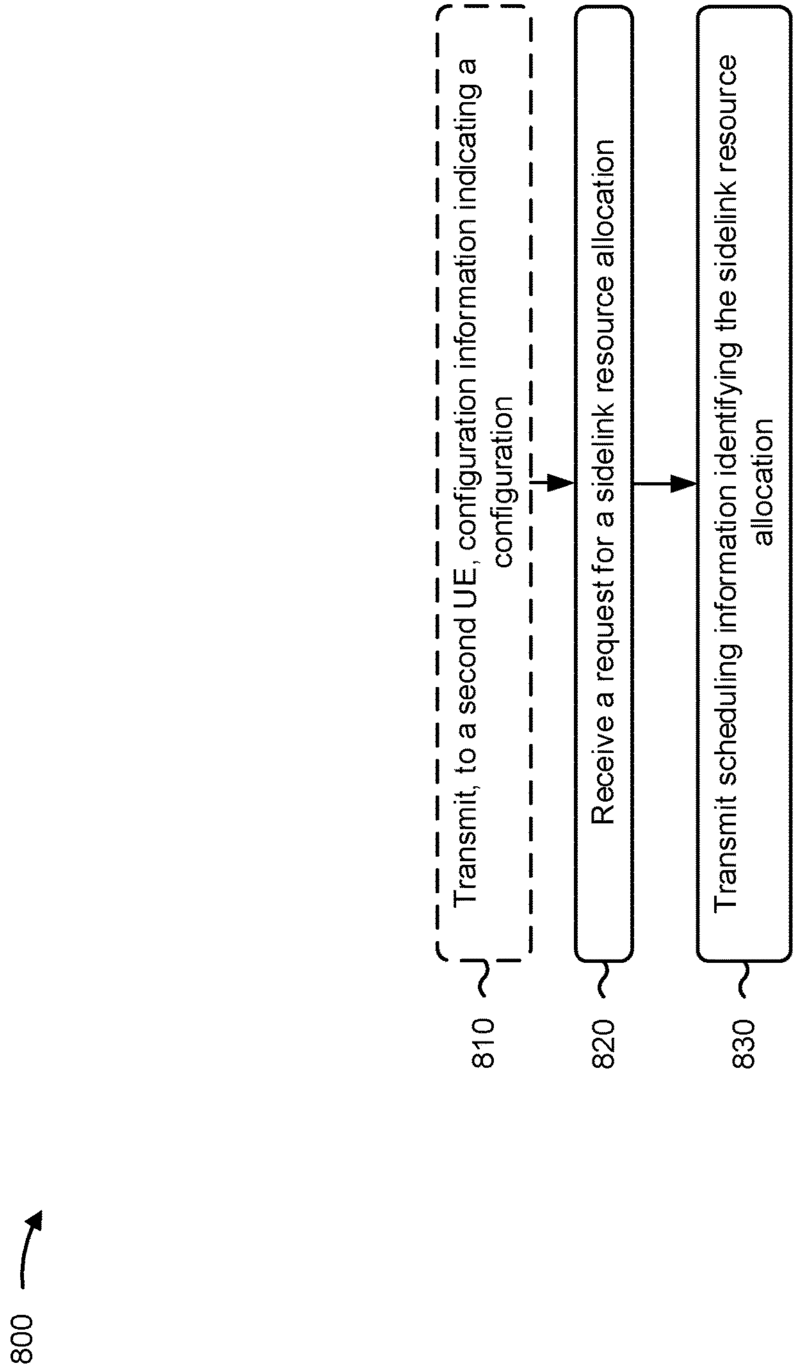

FIG. 8 is a diagram illustrating an example process 800 performed, for example, by a UE, in accordance with the present disclosure. Example process 800 is an example where a first UE (e.g., UE 120, UE 305, UE 405, the second UE of FIG. 5) performs operations associated with a sidelink scheduling request. Dashed blocks indicate optional steps.

As shown in FIG. 8, in some aspects, process 800 may include transmitting, to a second UE, configuration information indicating a configuration (block 810). For example, the UE (e.g., using antenna 252, demodulator 254, MIMO detector 256, receive processor 258, controller/processor 280, and/or memory 282) may transmit, to a second UE, configuration information indicating a configuration, as described above. In some aspects, the second UE may determine the configuration. In some aspects, the first UE and the second UE may negotiate the configuration. In some aspects, a base station may transmit the configuration to the second UE.

As shown in FIG. 8, in some aspects, process 800 may include receiving, from a second UE, a request for a sidelink resource allocation (block 820). For example, the UE (e.g., using antenna 252, demodulator 254, MIMO detector 256, receive processor 258, controller/processor 280, and/or memory 282) may receive, from a second UE, a request for a sidelink resource allocation, as described above.

As further shown in FIG. 8, in some aspects, process 800 may include transmitting scheduling information identifying the sidelink resource allocation (block 830). For example, the UE (e.g., using antenna 252, transmit processor 264, TX MIMO processor 266, modulator 254, controller/processor 280, and/or memory 282) may transmit scheduling information identifying the sidelink resource allocation, as described above.

Process 800 may include additional aspects, such as any single aspect or any combination of aspects described below and/or in connection with one or more other processes described elsewhere herein.

In a first aspect, the request is received on a first set of sidelink resources dedicated or reserved for requests for sidelink resource allocations.

In a second aspect, alone or in combination with the first aspect, the first set of sidelink resources is associated with a periodicity.

In a third aspect, alone or in combination with one or more of the first and second aspects, the first set of sidelink resources is configured for the second UE.

In a fourth aspect, alone or in combination with one or more of the first through third aspects, a configuration of the first set of sidelink resources indicates at least one of a periodicity associated with the first set of sidelink resources, a number of sidelink resources included in the first set of sidelink resources, a time duration of the first set of sidelink resources, or a number of frequency resources of the first set of sidelink resources.

In a fifth aspect, alone or in combination with one or more of the first through fourth aspects, the configuration corresponds to a set of priority levels for a transmission on the sidelink resource allocation.

In a sixth aspect, alone or in combination with one or more of the first through fifth aspects, process 800 includes transmitting, to the second UE, configuration information indicating the configuration.

In a seventh aspect, alone or in combination with one or more of the first through sixth aspects, the configuration corresponds to a resource pool associated with the sidelink resource allocation.

In an eighth aspect, alone or in combination with one or more of the first through seventh aspects, the first set of sidelink resources is configured on a particular sidelink carrier of a plurality of sidelink carriers associated with the first UE.

In a ninth aspect, alone or in combination with one or more of the first through eighth aspects, the request indicates a set of sidelink carriers for the sidelink resource allocation.

In a tenth aspect, alone or in combination with one or more of the first through ninth aspects, the request indicates a number of sidelink carriers for the sidelink resource allocation.

In an eleventh aspect, alone or in combination with one or more of the first through tenth aspects, the particular sidelink carrier is an only carrier of the plurality of sidelink carriers configured with a set of resources dedicated or reserved for requests for sidelink resource allocations.

In a twelfth aspect, alone or in combination with one or more of the first through eleventh aspects, each sidelink carrier of the plurality of sidelink carriers is associated with a respective set of sidelink resources dedicated or reserved for requests for sidelink resource allocations.

In a thirteenth aspect, alone or in combination with one or more of the first through twelfth aspects, the sidelink resource allocation is scheduled on the plurality of sidelink carriers based at least in part on a buffer status report being included in the request.

In a fourteenth aspect, alone or in combination with one or more of the first through thirteenth aspects, the scheduling information includes a sidelink carrier indicator.

In a fifteenth aspect, alone or in combination with one or more of the first through fourteenth aspects, the first set of sidelink resources is selected from a plurality of sets of sidelink resources dedicated or reserved for requests for sidelink resource allocations.

In a sixteenth aspect, alone or in combination with one or more of the first through fifteenth aspects, the plurality of sets of sidelink resources are included in a same set of time resources.

In a seventeenth aspect, alone or in combination with one or more of the first through sixteenth aspects, each set of sidelink resources, of the plurality of sets of sidelink resources, is included in a different set of time resources.

In an eighteenth aspect, alone or in combination with one or more of the first through seventeenth aspects, the request is generated using a sequence.

In a nineteenth aspect, alone or in combination with one or more of the first through eighteenth aspects, the request is received via a sidelink control channel or a sidelink shared channel.

In a twentieth aspect, alone or in combination with one or more of the first through nineteenth aspects, the request is associated with a timer indicating a minimum time spacing between transmissions of requests associated with a same scheduling request configuration, and a configuration value indicating a maximum number of requests associated with the same scheduling request configuration.

In a twenty-first aspect, alone or in combination with one or more of the first through twentieth aspects, the timer and the configuration value are independent of a timer and a configuration value associated with a radio access link of the first UE.

In a twenty-second aspect, alone or in combination with one or more of the first through twenty-first aspects, the timer and the configuration value are configured by the first UE or a base station.

In a twenty-third aspect, alone or in combination with one or more of the first through twenty-second aspects, the timer and the configuration value are negotiated by the first UE.

In a twenty-fourth aspect, alone or in combination with one or more of the first through twenty-third aspects, the request is received via a sidelink shared channel based at least in part on the second UE being scheduled with a sidelink resource for transmission to the first UE.

In a twenty-fifth aspect, alone or in combination with one or more of the first through twenty-fourth aspects, the scheduling information is transmitted on a second set of sidelink resources associated with a first set of sidelink resources on which the request is received.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
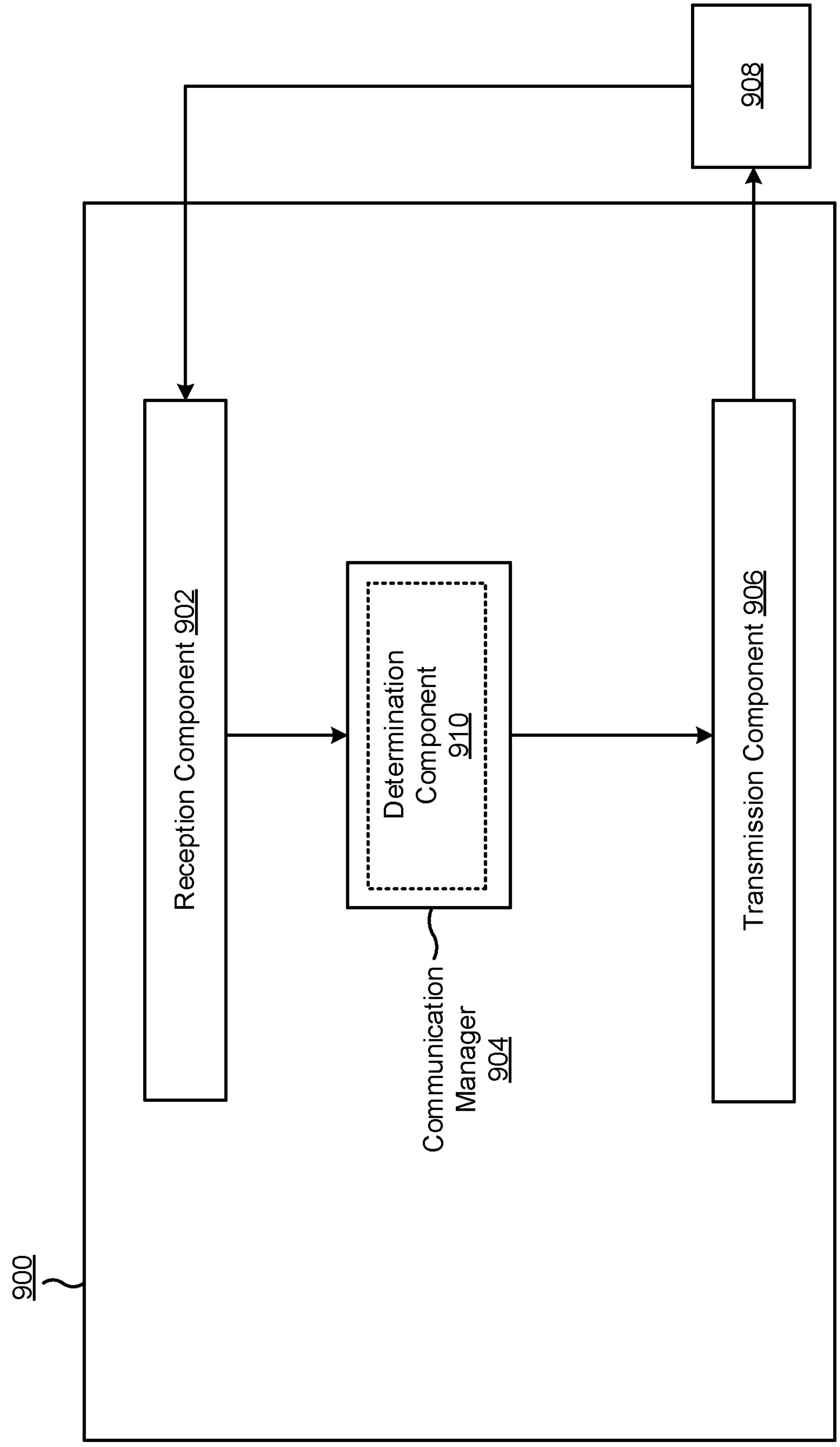
FIG. 9 is a block diagram of an example apparatus for wireless communication, in accordance with the present disclosure.

FIG. 9 is a block diagram of an example apparatus 900 for wireless communication in accordance with the present disclosure. The apparatus 900 may be a UE, or a UE may include the apparatus 900. In some aspects, the apparatus 900 corresponds to the first UE (e.g., UE B) of FIG. 5. In some aspects, the apparatus 900 corresponds to the second UE (e.g., UE A) of FIG. 5. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 3-6. Additionally or alternatively, the apparatus 900 may be configured to perform one or more processes described herein, such as process 700 of FIG. 7, process 800 of FIG. 8, or a combination thereof. In some aspects, the apparatus 900 may include one or more components of the UE described above in connection with FIG. 2.

The reception component 902 may provide means for receiving communications, such as reference signals, control information, data communications, or a combination thereof, from the apparatus 908. The reception component 902 may provide received communications to one or more other components of the apparatus 900, such as the communication manager 904. In some aspects, the reception component 902 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the first UE described above in connection with FIG. 2.

The transmission component 906 may provide means for transmitting communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may provide means for performing signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the first UE described above in connection with FIG. 2. In some aspects, the transmission component 906 may be co-located with the reception component 902 in a transceiver.

In some aspects, the communication manager 904 may transmit, to a second UE, a request for a sidelink resource allocation; and receive scheduling information identifying the sidelink resource allocation. In some aspects, the communication manager 904 may receive, from a second UE, a request for a sidelink resource allocation to be selected by the first UE; and transmit scheduling information identifying the sidelink resource allocation. In some aspects, the communication manager 904 may include a controller/processor, a memory, a scheduler, a communication unit, or a combination thereof, of the first UE described above in connection with FIG. 2.

In some aspects, the communication manager 904 may include a set of components, such as a determination component 910, or a combination thereof. Alternatively, the set of components may be separate and distinct from the communication manager 904.

In some aspects, the communication manager 904 and/or one or more components of the set of components may include or may be implemented within hardware (e.g., one or more of the circuitry components described in connection with FIG. 11). In some aspects, the communication manager 904 and/or one or more components of the set of components may include or may be implemented within a controller/processor, a memory, a scheduler, a communication unit, or a combination thereof, of the UE described above in connection with FIG. 2.

In some aspects, the communication manager 904 and/or one or more components of the set of components be implemented in code (e.g., as software or firmware stored in a memory), such as the code described in connection with FIG. 11. For example, the communication manager 904 and/or a component (or a portion of a component) may be implemented as instructions or code stored in a non-transitory computer-readable medium and executable by a controller or a processor to perform the functions or operations of the communication manager 904 and/or the component. If implemented in code, the functions of the communication manager 904 and/or a component may be executed by a controller/processor, a memory, a scheduler, a communication unit, or a combination thereof, of the UE described above in connection with FIG. 2.

In some aspects, the transmission component 906 may transmit, to a UE, a request for a sidelink resource allocation. The reception component 902 may receive scheduling information identifying the sidelink resource allocation. The reception component 902 may receive, from a base station or the second UE, a configuration. The determination component 910 may determine a first set of resources for the request based at least in part on the configuration.

In some aspects, the reception component 902 may receive, from a second UE, a request for a sidelink resource allocation. The transmission component 906 may transmit scheduling information identifying the sidelink resource allocation. The determination component 910 may determine the sidelink resource allocation.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
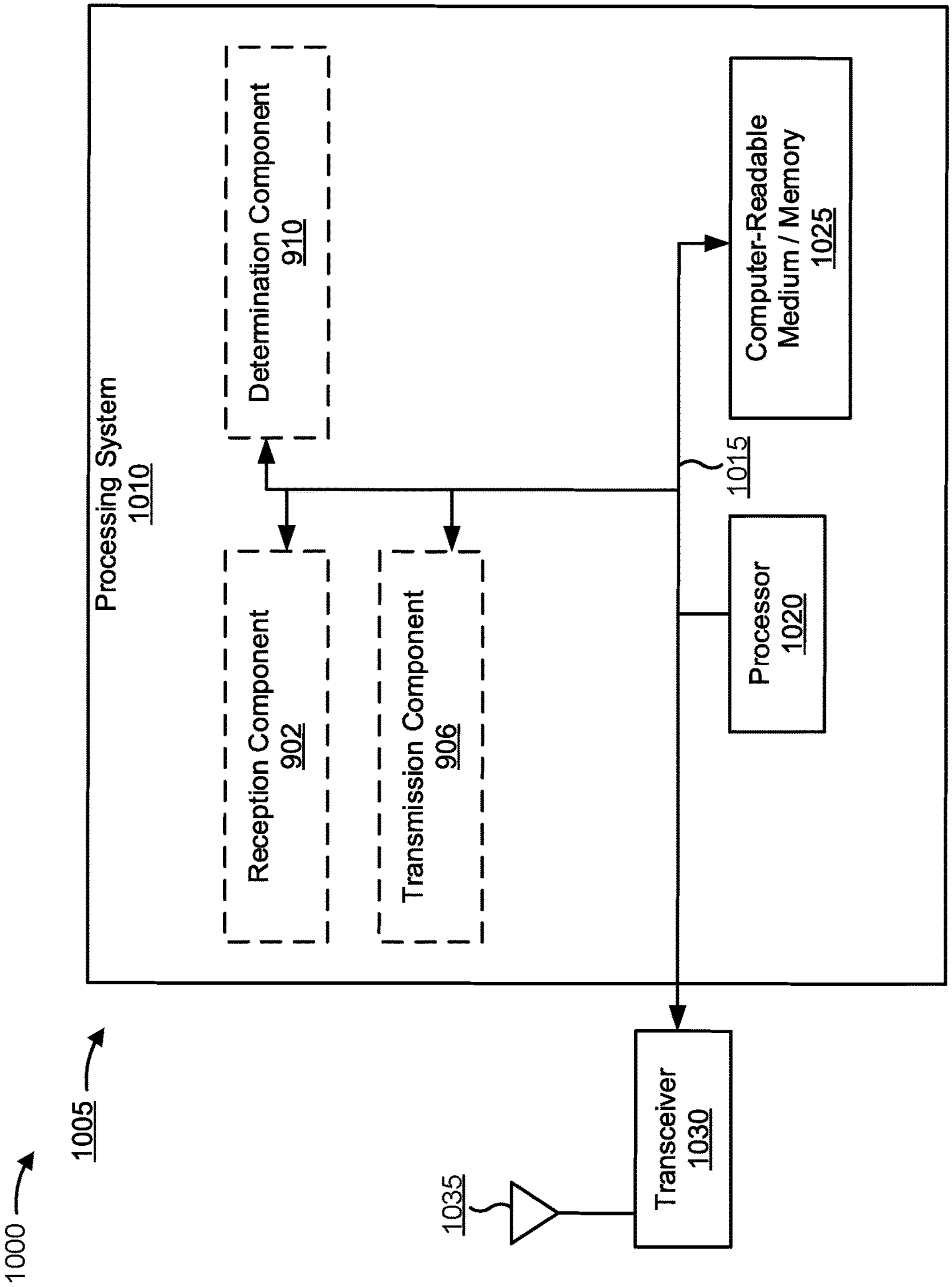
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. The apparatus 1005 may be a UE (e.g., the first UE or the second UE of FIG. 5).

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 906, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication provides means for transmitting, to a second UE, a request for a sidelink resource allocation; means for receiving scheduling information identifying the sidelink resource allocation; means for receiving, from a second UE, a request for a sidelink resource allocation; and means for transmitting scheduling information identifying the sidelink resource allocation. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
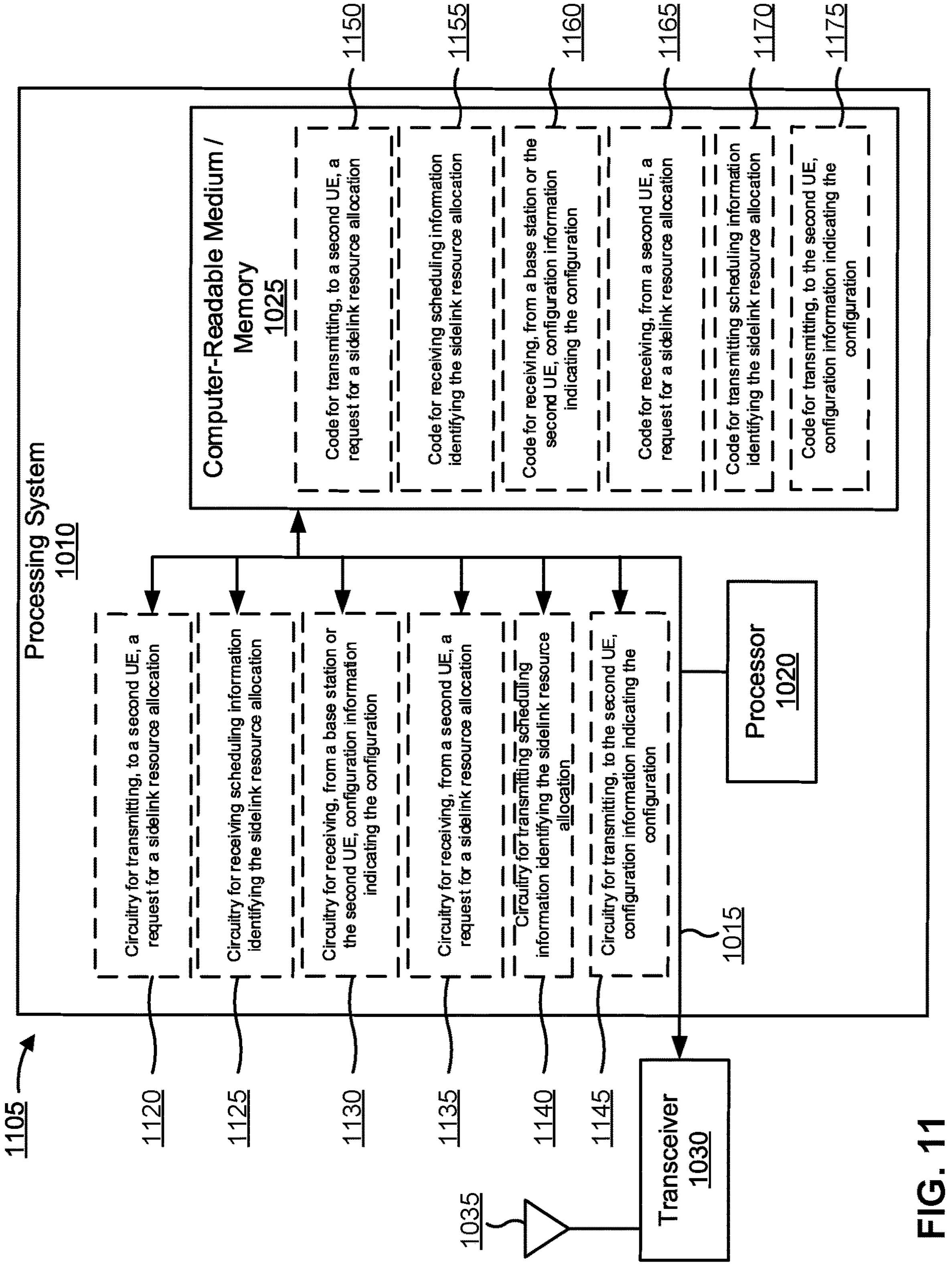
FIG. 11 is a diagram illustrating an example of an implementation of code and circuitry for an apparatus, in accordance with the present disclosure.

FIG. 11 is a diagram illustrating an example 1100 of an implementation of code and circuitry for an apparatus 1105. The apparatus 1105 may be a UE (e.g., a first UE).

As further shown in FIG. 11, the apparatus may include circuitry for transmitting, to a second UE, a request for a sidelink resource allocation (circuitry 1120). For example, the apparatus may include circuitry to enable the apparatus to transmit, to a second UE, a request for a sidelink resource allocation.

As further shown in FIG. 11, the apparatus may include circuitry for receiving scheduling information identifying the sidelink resource allocation (circuitry 1125). For example, the apparatus may include circuitry to enable the apparatus to receive scheduling information identifying the sidelink resource allocation.

As further shown in FIG. 11, the apparatus may include circuitry for receiving, from a base station or the second UE, configuration information indicating the configuration (circuitry 1130). For example, the apparatus may include circuitry to enable the apparatus to receive, from a base station or the second UE, configuration information indicating the configuration.

As further shown in FIG. 11, the apparatus may include circuitry for receiving, from a second UE, a request for a sidelink resource allocation (circuitry 1135). For example, the apparatus may include circuitry to enable the apparatus to receive, from a second UE, a request for a sidelink resource allocation.

As further shown in FIG. 11, the apparatus may include circuitry for transmitting scheduling information identifying the sidelink resource allocation (circuitry 1140). For example, the apparatus may include circuitry to enable the apparatus to transmit scheduling information identifying the sidelink resource allocation.

As further shown in FIG. 11, the apparatus may include circuitry for transmitting, to the second UE, configuration information indicating the configuration (circuitry 1145). For example, the apparatus may include circuitry to enable the apparatus to transmit, to the second UE, configuration information indicating the configuration.

As further shown in FIG. 11, the apparatus may include, stored in computer-readable medium/memory 1025, code for transmitting, to a second UE, a request for a sidelink resource allocation (code 1150). For example, the apparatus may include code that, when executed by the processor 1020, may cause the transceiver 1030 to transmit, to a second UE, a request for a sidelink resource allocation.

As further shown in FIG. 11, the apparatus may include, stored in computer-readable medium/memory 1025, code for receiving scheduling information identifying the sidelink resource allocation (code 1155). For example, the apparatus may include code that, when executed by the processor 1020, may cause the transceiver 1030 to receive scheduling information identifying the sidelink resource allocation.

As further shown in FIG. 11, the apparatus may include, stored in computer-readable medium/memory 1025, code for receiving, from a base station or the second UE, configuration information indicating the configuration (code 1160). For example, the apparatus may include code that, when executed by the processor 1020, may cause the processor 1020 to receive, from a base station or the second UE, configuration information indicating the configuration.

As further shown in FIG. 11, the apparatus may include, stored in computer-readable medium/memory 1025, code for receiving, from a second UE, a request for a sidelink resource allocation (code 1165). For example, the apparatus may include code that, when executed by the processor 1020, may cause the processor 1020 to receive, from a second UE, a request for a sidelink resource allocation.

As further shown in FIG. 11, the apparatus may include, stored in computer-readable medium/memory 1025, code for transmitting scheduling information identifying the sidelink resource allocation (code 1170). For example, the apparatus may include code that, when executed by the processor 1020, may cause the processor 1020 to transmit scheduling information identifying the sidelink resource allocation.

As further shown in FIG. 11, the apparatus may include, stored in computer-readable medium/memory 1025, code for transmitting, to the second UE, configuration information indicating the configuration (code 1175). For example, the apparatus may include code that, when executed by the processor 1020, may cause the processor 1020 to transmit, to the second UE, configuration information indicating the configuration.

FIG. 11 is provided as an example. Other examples may differ from what is described in connection with FIG. 11.

Figure 12:
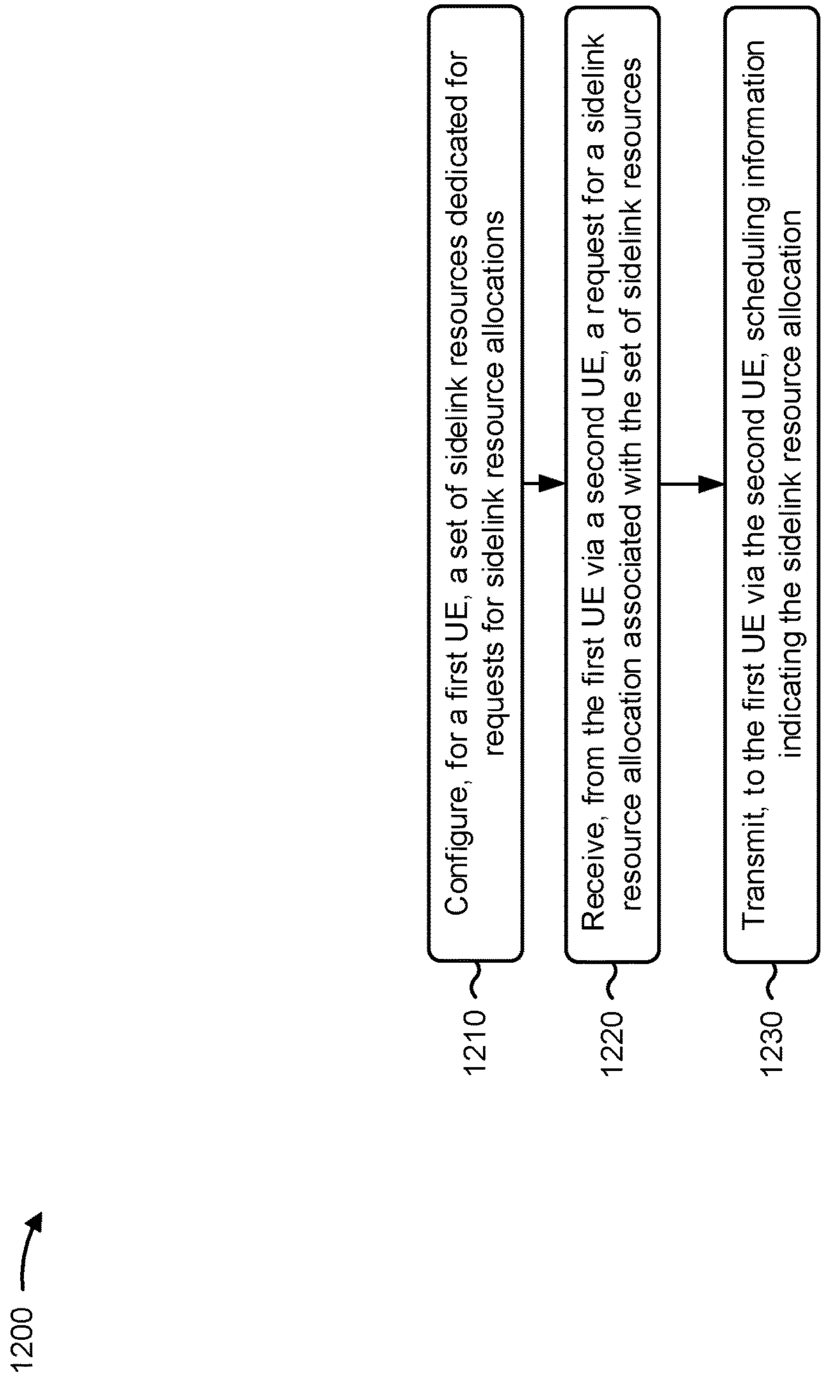
FIG. 12 is a diagram illustrating an example process associated with signaling an indication of a sidelink transmission, in accordance with the present disclosure.

FIG. 12 is a diagram illustrating an example process 1200 performed, for example, by a base station, in accordance with the present disclosure. Example process 1200 is an example where the base station (e.g., base station 110) performs operations associated with a sidelink scheduling request.

As shown in FIG. 12, in some aspects, process 1200 may include configuring, for a first UE, a set of sidelink resources dedicated for requests for sidelink resource allocations (block 1210). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may configure, for a first UE, a set of sidelink resources dedicated for requests for sidelink resource allocations, as described above.

As further shown in FIG. 12, in some aspects, process 1200 may include receiving, from the first UE via a second UE, a request for a sidelink resource allocation associated with the set of sidelink resources (block 1220). For example, the base station (e.g., using antenna 234, demodulator 232, MIMO detector 236, receive processor 238, controller/processor 240, and/or memory 242) may receive, from the first UE via a second UE, a request for a sidelink resource allocation associated with the set of sidelink resources, as described above.

As further shown in FIG. 12, in some aspects, process 1200 may include transmitting, to the first UE via the second UE, scheduling information indicating the sidelink resource allocation (block 1230). For example, the base station (e.g., using transmit processor 220, TX MIMO processor 230, modulator 232, antenna 234, controller/processor 240, memory 242, and/or scheduler 246) may transmit, to the first UE via the second UE, scheduling information indicating the sidelink resource allocation, as described above.

Process 1200 may include additional aspects, such as any single aspect or any combination of aspects described below and/or in connection with one or more other processes described elsewhere herein.

In a first aspect, a configuration of the set of sidelink resources indicates at least one of a periodicity associated with the set of sidelink resources, a number of sidelink resources included in the set of sidelink resources, a time duration of the set of sidelink resources, or a number of frequency resources of the set of sidelink resources.

In a second aspect, alone or in combination with the first aspect, the configuration corresponds to a set of priority levels for a transmission on the sidelink resource allocation In a third aspect, alone or in combination with one or more of the first and second aspects, the configuration corresponds to a resource pool associated with the sidelink resource allocation.

In a fourth aspect, alone or in combination with one or more of the first through third aspects, process 1200 includes configuring, for the second UE, a second set of sidelink resources associated with the set of sidelink resources, wherein the second set of sidelink resources is associated with relaying the sidelink resource allocation to the first UE.

In a fifth aspect, alone or in combination with one or more of the first through fourth aspects, the set of sidelink resources is associated with a periodicity.

In a sixth aspect, alone or in combination with one or more of the first through fifth aspects, the set of sidelink resources is configured on a particular sidelink carrier of a plurality of sidelink carriers associated with the first UE.

In a seventh aspect, alone or in combination with one or more of the first through sixth aspects, configuring the set of sidelink resources further comprises configuring a plurality of sets of sidelink resources dedicated or reserved for requests for sidelink resource allocations.

In an eighth aspect, alone or in combination with one or more of the first through seventh aspects, the plurality of sets of sidelink resources are included in a same set of time resources.

In a ninth aspect, alone or in combination with one or more of the first through eighth aspects, each set of sidelink resources, of the plurality of sets of sidelink resources, is included in a different set of time resources.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
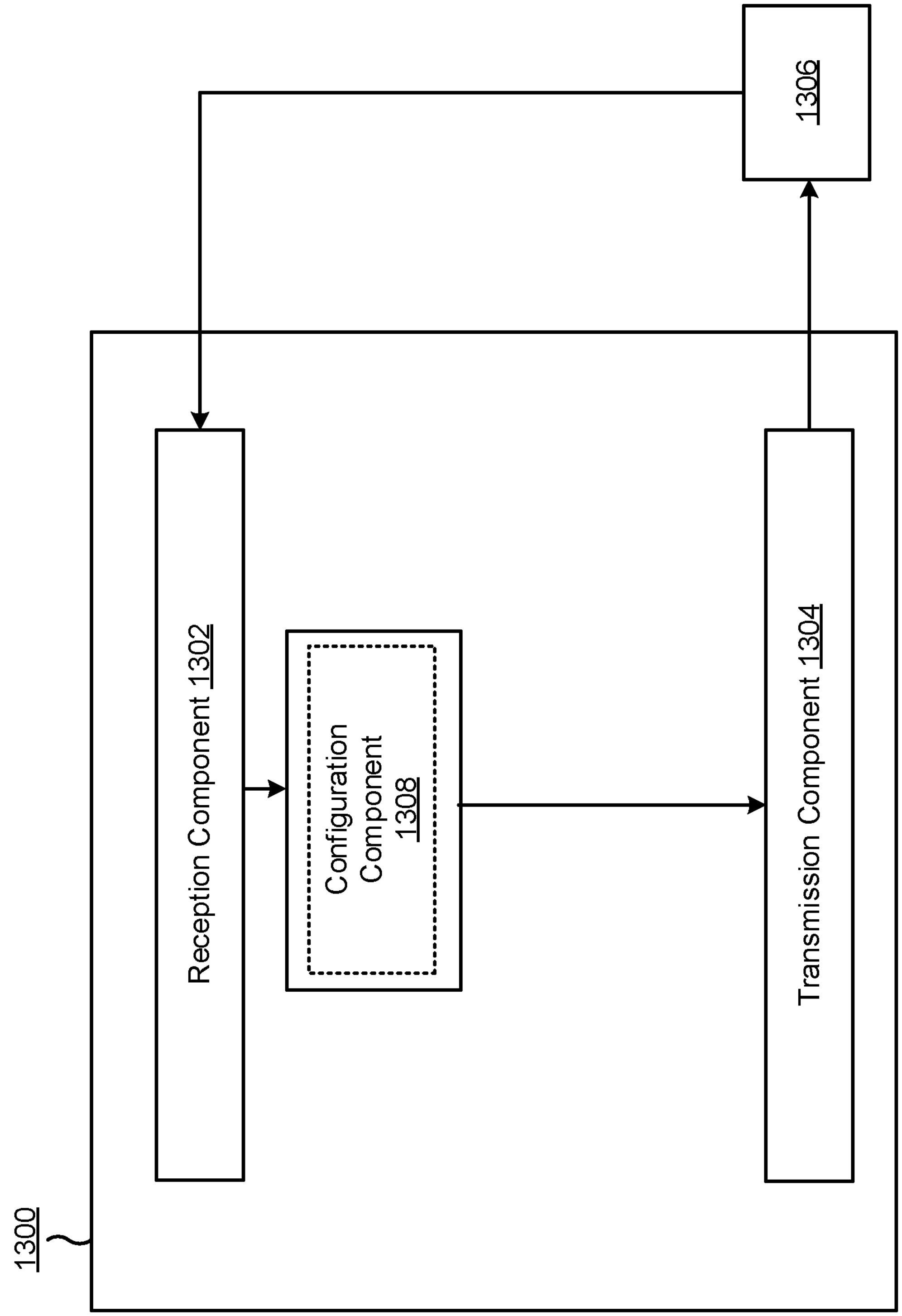
FIG. 13 is a block diagram of an example apparatus for wireless communication, in accordance with the present disclosure.

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a configuration component 1308, among other examples.

In some aspects, the apparatus 1300 may be configured to perform one or more operations described herein in connection with FIGS. 3-6. Additionally or alternatively, the apparatus 1300 may be configured to perform one or more processes described herein, such as process 1200 of FIG. 12. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The configuration component 1308 may configure, for a first UE, a set of sidelink resources dedicated for requests for sidelink resource allocations. In some aspects, the configuration component 1308 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The reception component 1302 may receive, from the first UE via a second UE, a request for a sidelink resource allocation associated with the set of sidelink resources. The transmission component 1304 may transmit, to the first UE via the second UE, scheduling information indicating the sidelink resource allocation. The configuration component 1308 may configure, for the second UE, a second set of sidelink resources associated with the set of sidelink resources, wherein the second set of sidelink resources is associated with relaying the sidelink resource allocation to the first UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
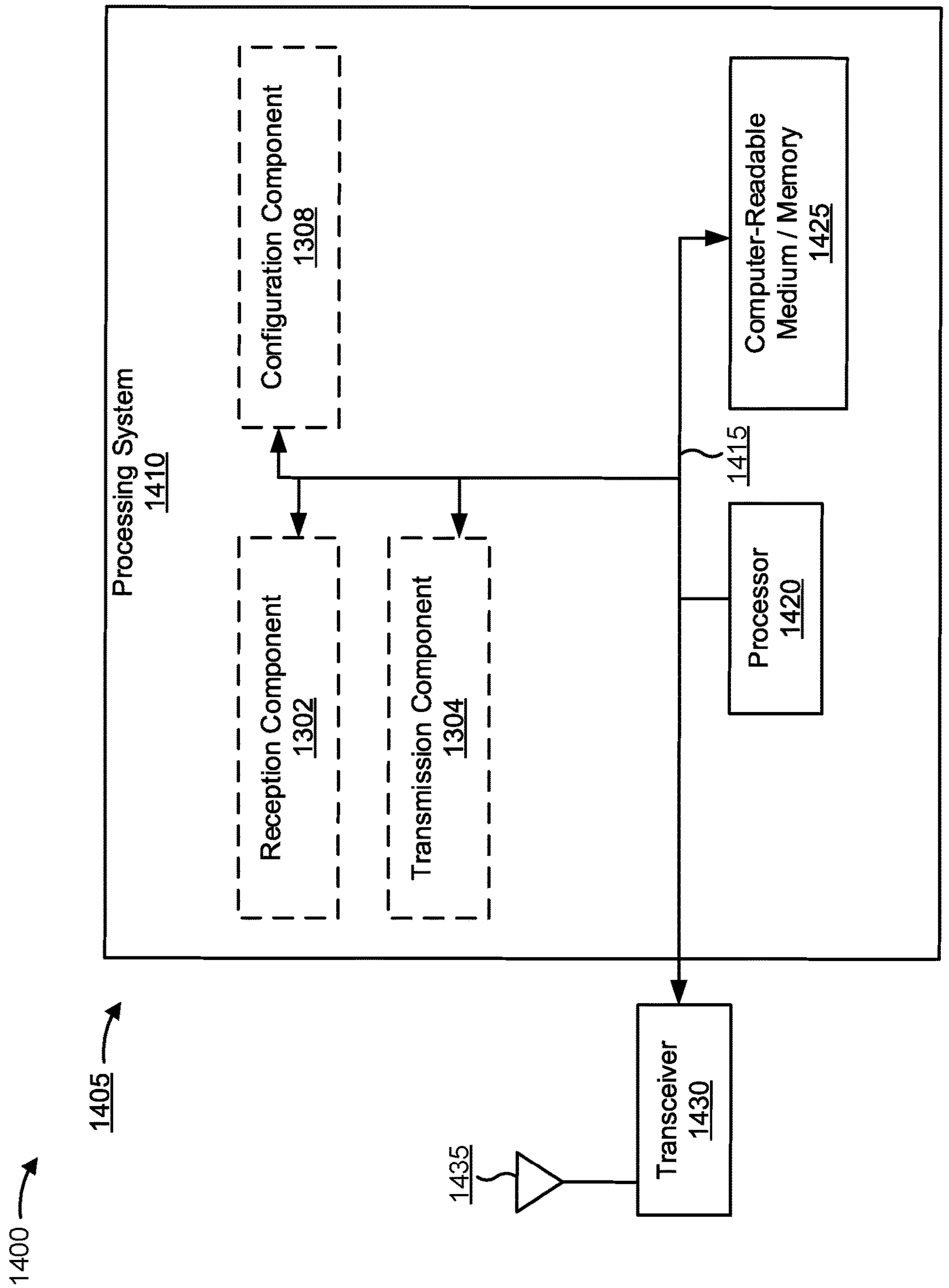
FIG. 14 is a diagram illustrating an example of a hardware implementation for an apparatus employing a processing system, in accordance with the present disclosure.

FIG. 14 is a diagram illustrating an example 1400 of a hardware implementation for an apparatus 1405 employing a processing system 1410. The apparatus 1405 may be a base station.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, power management circuits, and/or the like.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 242 and/or at least one of the TX MIMO processor 230, the RX processor 238, and/or the controller/processor 240. In some aspects, the apparatus 1405 for wireless communication provides means for configuring, for a first user equipment (UE), a set of sidelink resources dedicated for requests for sidelink resource allocations; means for receiving, from the first UE via a second UE, a request for a sidelink resource allocation associated with the set of sidelink resources; and means for transmitting, to the first UE via the second UE, scheduling information indicating the sidelink resource allocation. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

Figure 15:
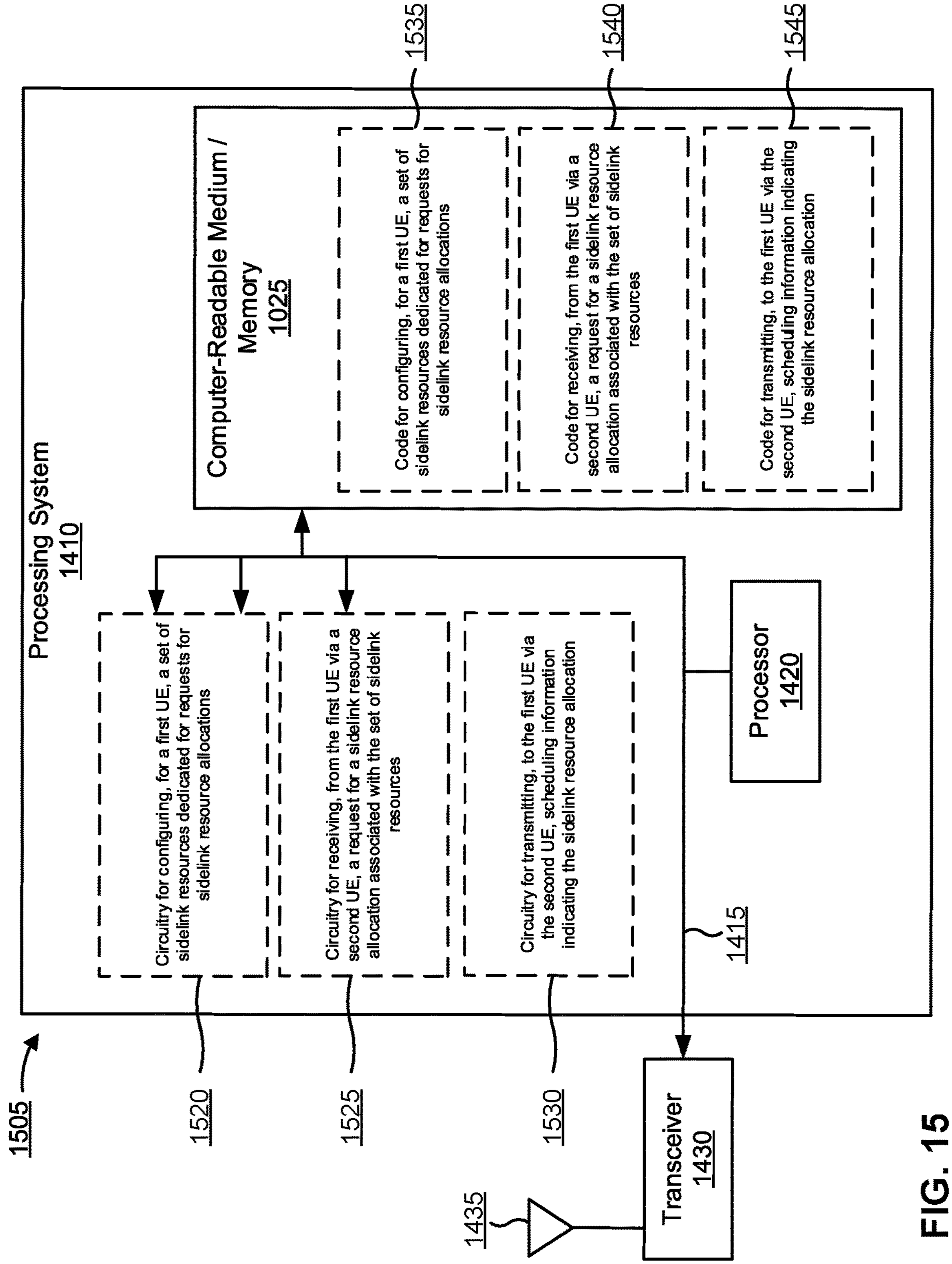
FIG. 15 is a diagram illustrating an example of an implementation of code and circuitry for an apparatus, in accordance with the present disclosure.

FIG. 15 is a diagram illustrating an example 1500 of an implementation of code and circuitry for an apparatus 1505. The apparatus 1505 may be a base station.

As further shown in FIG. 15, the apparatus may include circuitry for configuring, for a first UE, a set of sidelink resources dedicated for requests for sidelink resource allocations (circuitry 1520). For example, the apparatus may include circuitry to enable the apparatus to configure, for a first UE, a set of sidelink resources dedicated for requests for sidelink resource allocations.

As further shown in FIG. 15, the apparatus may include circuitry for receiving, from the first UE via a second UE, a request for a sidelink resource allocation associated with the set of sidelink resources (circuitry 1525). For example, the apparatus may include circuitry to enable the apparatus to receive, from the first UE via a second UE, a request for a sidelink resource allocation associated with the set of sidelink resources.

As further shown in FIG. 15, the apparatus may include circuitry for transmitting, to the first UE via the second UE, scheduling information indicating the sidelink resource allocation (circuitry 1530). For example, the apparatus may include circuitry to enable the apparatus to transmit, to the first UE via the second UE, scheduling information indicating the sidelink resource allocation.

As further shown in FIG. 15, the apparatus may include, stored in computer-readable medium/memory 1425, code for configuring, for a first UE, a set of sidelink resources dedicated for requests for sidelink resource allocations (code 1535). For example, the apparatus may include code that, when executed by the processor 1420, may cause the transceiver 1430 to configure, for a first UE, a set of sidelink resources dedicated for requests for sidelink resource allocations.

As further shown in FIG. 15, the apparatus may include, stored in computer-readable medium/memory 1425, code for receiving, from the first UE via a second UE, a request for a sidelink resource allocation associated with the set of sidelink resources (code 1540). For example, the apparatus may include code that, when executed by the processor 1420, may cause the transceiver 1430 to receive, from the first UE via a second UE, a request for a sidelink resource allocation associated with the set of sidelink resources.

As further shown in FIG. 15, the apparatus may include, stored in computer-readable medium/memory 1425, code for transmitting, to the first UE via the second UE, scheduling information indicating the sidelink resource allocation (code 1545). For example, the apparatus may include code that, when executed by the processor 1420, may cause the processor 1420 to transmit, to the first UE via the second UE, scheduling information indicating the sidelink resource allocation.

FIG. 15 is provided as an example. Other examples may differ from what is described in connection with FIG. 15.

The following provides an overview of some Aspects of the present disclosure:

Aspect 1: A method of wireless communication performed by a first user equipment (UE), comprising: transmitting, to a second UE, a request for a sidelink resource allocation; and receiving scheduling information identifying the sidelink resource allocation.

Aspect 2: The method of Aspect 1, wherein the request is transmitted on a first set of sidelink resources reserved for requests for sidelink resource allocations.

Aspect 3: The method of Aspect 2, wherein the first set of sidelink resources is associated with a periodicity.

Aspect 4: The method of Aspect 2, wherein the first set of sidelink resources is configured for the first UE.

Aspect 5: The method of Aspect 2, wherein a configuration of the first set of sidelink resources indicates at least one of: a periodicity associated with the first set of sidelink resources, a number of sidelink resources included in the first set of sidelink resources, a time duration of the first set of sidelink resources, or a number of frequency resources of the first set of sidelink resources.

Aspect 6: The method of Aspect 5, wherein the configuration corresponds to a set of priority levels for a transmission on the sidelink resource allocation.

Aspect 7: The method of Aspect 5, further comprising: receiving, from a base station or the second UE, configuration information indicating the configuration.

Aspect 8: The method of Aspect 7, wherein the configuration corresponds to a resource pool associated with the sidelink resource allocation.

Aspect 9: The method of Aspect 2, wherein the first set of sidelink resources is configured on a particular sidelink carrier of a plurality of sidelink carriers associated with the first UE.

Aspect 10: The method of Aspect 9, wherein the particular sidelink carrier is an only carrier of the plurality of sidelink carriers configured with a set of resources dedicated or reserved for requests for sidelink resource allocations.

Aspect 11: The method of Aspect 9, wherein each sidelink carrier of the plurality of sidelink carriers is associated with a respective set of sidelink resources dedicated or reserved for requests for sidelink resource allocations.

Aspect 12: The method of Aspect 9, wherein the sidelink resource allocation is scheduled on the plurality of sidelink carriers.

Aspect 13: The method of Aspect 2, wherein the first set of sidelink resources is selected from a plurality of sets of sidelink resources dedicated or reserved for requests for sidelink resource allocations.

Aspect 14: The method of Aspect 1, wherein the first configuration indicates a sequence for generating the request.

Aspect 15: The method of Aspect 1, wherein the first configuration indicates a sidelink control channel or a sidelink shared channel for transmitting the request.

Aspect 16: The method of Aspect 1, wherein the first configuration indicates a timer indicating a minimum time spacing between transmissions of requests associated with a same scheduling request configuration, and a configuration value indicating a maximum number of requests associated with the same scheduling request configuration.

Aspect 17: The method of Aspect 1, wherein the request is transmitted via a sidelink shared channel based at least in part on the first UE being scheduled with a sidelink resource for transmission to the second UE.

Aspect 18: The method of Aspect 1, wherein the scheduling information from the second UE is received on a second set of sidelink resources associated with a set of sidelink resources on which the request is transmitted.

Aspect 19: A method of wireless communication performed by a first user equipment (UE), comprising: receiving, from a second UE and using a first configuration, a request for a sidelink resource allocation; and transmitting, using a second configuration, scheduling information indicating a resource associated with the sidelink resource allocation.

Aspect 20: The method of Aspect 19, wherein the first configuration indicates to receive the request on a first set of sidelink resources dedicated or reserved for requests for sidelink resource allocations.

Aspect 21: The method of Aspect 20, wherein the second configuration indicates at least one of: a periodicity associated with the first set of sidelink resources, a number of sidelink resources included in the first set of sidelink resources, a time duration of the first set of sidelink resources, or a number of frequency resources of the first set of sidelink resources.

Aspect 22: The method of Aspect 19, wherein the request is associated with a timer indicating a minimum time spacing between transmissions of requests associated with a same scheduling request configuration, and a configuration value indicating a maximum number of requests associated with the same scheduling request configuration.

Aspect 23: A method of wireless communication performed by a base station, comprising: configuring, for a first user equipment (UE), a set of sidelink resources dedicated for requests for sidelink resource allocations; receiving, from the first UE via a second UE, a request for a sidelink resource allocation associated with the set of sidelink resources; and transmitting, to the first UE via the second UE, scheduling information indicating the sidelink resource allocation.

Aspect 24: The method of Aspect 23, wherein a configuration of the set of sidelink resources indicates at least one of: a periodicity associated with the set of sidelink resources, a number of sidelink resources included in the set of sidelink resources, a time duration of the set of sidelink resources, or a number of frequency resources of the set of sidelink resources.

Aspect 25: The method of Aspect 24, wherein the configuration corresponds to a set of priority levels for a transmission on the sidelink resource allocation Aspect 26: The method of Aspect 24, wherein the set of sidelink resources is associated with a periodicity.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:

one or more memories; and one or more processors, coupled to the one or more memories, the one or more processors individually or collectively configured to:

receive, from a base station or a second UE, configuration information indicating a configuration of a first set of sidelink resources, of a set of periodic sidelink resources, wherein the first set of sidelink resources are reserved for requests for sidelink resource allocations;

transmit, to a second UE, a request for a sidelink resource allocation, wherein the request is transmitted on the first set of sidelink resources, wherein the request includes an indication of one or more sidelink carriers corresponding to the sidelink resource allocation, wherein the request is associated with a timer indicating a minimum time spacing between transmissions of requests associated with a same scheduling request configuration, and a configuration value indicating a maximum number of requests associated with the same scheduling request configuration; and receive, from the second UE, scheduling information identifying the sidelink resource allocation.

2. The first UE of claim 1, wherein the first set of sidelink resources is associated with a periodicity.

3. The first UE of claim 1, wherein the first set of sidelink resources is configured for the first UE.

4. The first UE of claim 1, wherein the configuration of the first set of sidelink resources indicates at least one of:

a periodicity associated with the set of periodic sidelink resources, a number of sidelink resources included in the first set of sidelink resources, a time duration of the first set of sidelink resources, or a number of frequency resources of the first set of sidelink resources.

5. The first UE of claim 4, wherein the configuration corresponds to a set of priority levels for a transmission on the sidelink resource allocation.

6. The first UE of claim 1, wherein the configuration corresponds to a resource pool associated with the sidelink resource allocation.

7. The first UE of claim 1, wherein the first set of sidelink resources is configured on a particular sidelink carrier of the one or more of sidelink carriers, wherein the one or more sidelink carriers are associated with the first UE.

8. The first UE of claim 7, wherein the particular sidelink carrier is an only carrier of the one or more sidelink carriers configured with a set of resources dedicated or reserved for requests for sidelink resource allocations.

9. The first UE of claim 7, wherein each sidelink carrier of the one or more sidelink carriers is associated with a respective set of sidelink resources dedicated or reserved for requests for sidelink resource allocations.

10. The first UE of claim 7, wherein the sidelink resource allocation is scheduled on the one or more sidelink carriers.

11. The first UE of claim 1, wherein the first set of sidelink resources is selected from a plurality of sets of sidelink resources dedicated or reserved for requests for sidelink resource allocations.

12. The first UE of claim 1, wherein the request is generated using a sequence.

13. The first UE of claim 1, wherein the request is transmitted on a sidelink control channel or a sidelink shared channel.

14. The first UE of claim 1, wherein the request is transmitted via a sidelink shared channel based at least in part on the first UE being scheduled with a sidelink resource for transmission to the second UE.

15. The first UE of claim 1, wherein the scheduling information from the second UE is received on a second set of sidelink resources associated with a set of sidelink resources on which the request is transmitted.

16. A first user equipment (UE) for wireless communication, comprising:

one or more memories; and one or more processors, coupled to the one or more memories, the one or more processors individually or collectively configured to:

receive, from a base station, configuration information indicating a configuration of a first set of sidelink resources, of a set of periodic sidelink resources, wherein the first set of sidelink resources are reserved for requests for sidelink resource allocations;

receive, from a second UE and using a first configuration, a request for a sidelink resource allocation, wherein the request is received on the first set of sidelink resources, wherein the request includes an indication of one or more sidelink carriers corresponding to the sidelink resource allocation, wherein the request is associated with a timer indicating a minimum time spacing between transmissions of requests associated with a same scheduling request configuration, and a configuration value indicating a maximum number of requests associated with the same scheduling request configuration; and transmit, to the second UE and using a second configuration, scheduling information indicating a resource associated with the sidelink resource allocation.

17. The first UE of claim 16,
wherein the request indicates at least one of:
a periodicity associated with the first set of sidelink resources,
a number of sidelink resources included in the first set of sidelink resources,
a time duration of the first set of sidelink resources, or
a number of frequency resources of the first set of sidelink resources.

18. The first UE of claim 16,
wherein the configuration corresponds to a resource pool associated with the sidelink resource allocation.

19. The first UE of claim 16,
wherein the first set of sidelink resources is configured on a particular sidelink carrier of the one or more of sidelink carriers, wherein the one or more sidelink carriers are associated with the first UE.

20. A base station for wireless communication, comprising:
one or more memories; and
one or more processors, coupled to the one or more memories, the one or more processors individually or collectively configured to:
configure, for a first user equipment (UE), a set of sidelink resources, of a set of periodic sidelink resources, dedicated for requests for sidelink resource allocations;
transmit, to the first UE, configuration information indicating a configuration of the set of sidelink resources, of the set of periodic sidelink resources, wherein the set of sidelink resources are reserved for requests for sidelink resource allocations;
receive, from the first UE via a second UE, a request for a sidelink resource allocation associated with the set of sidelink resources, wherein the request includes an indication of one or more sidelink carriers corresponding to the sidelink resource allocation, wherein the request is associated with a timer indicating a minimum time spacing between transmissions of requests associated with a same scheduling request configuration, and a configuration value indicating a maximum number of requests associated with the same scheduling request configuration; and
transmit, to the first UE via the second UE, scheduling information indicating the sidelink resource allocation.

21. The base station of claim 20,
wherein a configuration of the set of sidelink resources indicates at least one of:
a periodicity associated with the set of sidelink resources,
a number of sidelink resources included in the set of sidelink resources,
a time duration of the set of sidelink resources, or
a number of frequency resources of the set of sidelink resources.

22. The base station of claim 21,
wherein the configuration corresponds to a set of priority levels for a transmission on the sidelink resource allocation.

23. The base station of claim 21,
wherein the set of sidelink resources is associated with a periodicity.

24. A method of wireless communication performed by a first user equipment (UE), comprising:
receiving, from a base station or a second UE, configuration information indicating a configuration of a first set of sidelink resources, of a set of periodic sidelink resources, wherein the first set of sidelink resources are reserved for requests for sidelink resource allocations;
transmitting, to a second UE, a request for a sidelink resource allocation, wherein the request is transmitted on the first set of sidelink resources, wherein the request includes an indication of one or more sidelink carriers corresponding to the sidelink resource allocation, wherein the request is associated with a timer indicating a minimum time spacing between transmissions of requests associated with a same scheduling request configuration, and a configuration value indicating a maximum number of requests associated with the same scheduling request configuration; and
receiving, from the second UE, scheduling information identifying the sidelink resource allocation.

25. The method of claim 24,
wherein the first set of sidelink resources is associated with a periodicity.

26. The method of claim 24,
wherein the first set of sidelink resources is configured for the first UE.

27. The method of claim 24,
wherein a configuration of the first set of sidelink resources indicates at least one of:
a periodicity associated with the first set of sidelink resources,
a number of sidelink resources included in the first set of sidelink resources,
a time duration of the first set of sidelink resources, or
a number of frequency resources of the first set of sidelink resources.

28. The method of claim 27,
wherein the configuration corresponds to a set of priority levels for a transmission on the sidelink resource allocation.

* * * * *